(12) United States Patent
DeSimone et al.

(10) Patent No.: US 11,433,613 B2
(45) Date of Patent: Sep. 6, 2022

(54) INTEGRATED ADDITIVE MANUFACTURING SYSTEMS

(71) Applicant: Carbon, Inc., Redwood City, CA (US)

(72) Inventors: Joseph M. DeSimone, Monte Sereno, CA (US); Roy Goldman, Cupertino, CA (US); Steven Kenneth Pollack, Redwood City, CA (US)

(73) Assignee: Carbon, Inc., Redwood City, CA (US)

( * ) Notice: Subject to any disclaimer, the term of this patent is extended or adjusted under 35 U.S.C. 154(b) by 104 days.

(21) Appl. No.: 16/493,821

(22) PCT Filed: Mar. 12, 2018

(86) PCT No.: PCT/US2018/021916
§ 371 (c)(1),
(2) Date: Sep. 13, 2019

(87) PCT Pub. No.: WO2018/169821
PCT Pub. Date: Sep. 20, 2018

(65) Prior Publication Data
US 2020/0130266 A1   Apr. 30, 2020

Related U.S. Application Data

(60) Provisional application No. 62/596,952, filed on Dec. 11, 2017, provisional application No. 62/506,247, (Continued)

(51) Int. Cl.
*B29C 64/35* (2017.01)
*B33Y 10/00* (2015.01)
(Continued)

(52) U.S. Cl.
CPC ............ *B29C 64/35* (2017.08); *B29C 64/124* (2017.08); *B29C 64/188* (2017.08); (Continued)

(58) Field of Classification Search
CPC ..... B29C 64/171; B29C 64/35; B29C 64/188; B29C 64/393; B29C 64/176; B29C 64/182; B29C 64/386; B29C 64/295
See application file for complete search history.

(56) References Cited

U.S. PATENT DOCUMENTS

| 5,236,637 | A  | 8/1993 | Hull |
| 8,260,447 | B2 | 9/2012 | Mattes et al. |

(Continued)

FOREIGN PATENT DOCUMENTS

| EP | 1077125 | 2/2001 |
| EP | 2727709 | 5/2014 |

(Continued)

OTHER PUBLICATIONS

Stratasys, "Fortus 900mc/F900 User Guide", Nov. 2016, https://support.stratasys.com/en/printers/fdm/fortus-900mc-f900 (Year: 2016).*

(Continued)

*Primary Examiner* — Joseph S Del Sole
*Assistant Examiner* — Ariella Machness
(74) *Attorney, Agent, or Firm* — Myers Bigel, P.A.

(57) ABSTRACT

An integrated additive manufacturing system includes: (a) at least one resin supply (41); (b) a plurality of additive manufacturing machines (43) on which parts may be produced, each of the additive manufacturing machines (43) operatively associated with the at least one resin supply (41); and (c) at least one peripheral machine (200, 48, 220) operatively associated with each of the additive manufacturing machines and the at least one resin supply.

18 Claims, 12 Drawing Sheets

Related U.S. Application Data filed on May 15, 2017, provisional application No. 62/471,675, filed on Mar. 15, 2017.

(51) Int. Cl.

| | | |
|---|---|---|
| *B33Y 30/00* | (2015.01) | |
| *B33Y 40/00* | (2020.01) | |
| *B33Y 50/02* | (2015.01) | |
| *B29C 64/245* | (2017.01) | |
| *B29C 64/295* | (2017.01) | |
| *B29C 64/393* | (2017.01) | |
| *B29C 64/188* | (2017.01) | |
| *B33Y 40/20* | (2020.01) | |
| *B29C 64/124* | (2017.01) | |
| *B29C 64/321* | (2017.01) | |
| *B29C 64/255* | (2017.01) | |
| *B29C 64/371* | (2017.01) | |

(52) U.S. Cl.
CPC .......... *B29C 64/245* (2017.08); *B29C 64/255* (2017.08); *B29C 64/295* (2017.08); *B29C 64/321* (2017.08); *B29C 64/371* (2017.08); *B29C 64/393* (2017.08); *B33Y 10/00* (2014.12); *B33Y 30/00* (2014.12); *B33Y 40/00* (2014.12); *B33Y 50/02* (2014.12); *B33Y 40/20* (2020.01)

(56) References Cited

U.S. PATENT DOCUMENTS

| | | | |
|---|---|---|---|
| 9,205,601 | B2 | 12/2015 | Desimone et al. |
| 9,453,142 | B2 | 9/2016 | Rolland et al. |
| 10,843,266 | B2* | 11/2020 | DeMuth ................ B29C 64/379 |
| 2006/0022379 | A1 | 2/2006 | Wicker et al. |
| 2009/0037011 | A1 | 2/2009 | Spiridonov et al. |
| 2009/0173443 | A1 | 7/2009 | Kozlak et al. |
| 2009/0283109 | A1* | 11/2009 | Moussa .................. B29C 64/35 134/1 |
| 2009/0283119 | A1 | 11/2009 | Moussa et al. |
| 2010/0086721 | A1 | 4/2010 | Batchelder |
| 2010/0170613 | A1 | 7/2010 | Kendall et al. |
| 2011/0117268 | A1 | 5/2011 | Batchelder et al. |
| 2012/0183701 | A1 | 7/2012 | Pilz et al. |
| 2013/0075957 | A1* | 3/2013 | Swanson ................ B29C 64/40 264/405 |
| 2013/0295212 | A1 | 11/2013 | Chen et al. |
| 2014/0117585 | A1* | 5/2014 | Douglas ................ B33Y 30/00 264/401 |
| 2015/0252190 | A1 | 9/2015 | Rodgers et al. |
| 2015/0290878 | A1 | 10/2015 | Houben et al. |
| 2016/0229123 | A1* | 8/2016 | Carlson ................ B33Y 50/02 |
| 2016/0328660 | A1 | 11/2016 | Huang |
| 2017/0028628 | A1 | 2/2017 | Evans et al. |
| 2017/0173889 | A1* | 6/2017 | Thomas-Lepore .... B33Y 50/00 |
| 2018/0222115 | A1 | 8/2018 | Watanabe et al. |
| 2018/0236726 | A1 | 8/2018 | Etcheson et al. |
| 2019/0224917 | A1 | 7/2019 | Venkatakrishnan et al. |
| 2021/0187850 | A1 | 6/2021 | Sayers |

FOREIGN PATENT DOCUMENTS

| | | |
|---|---|---|
| WO | 2015/073322 | 5/2015 |
| WO | 2015/112959 | 7/2015 |
| WO | 2016/184888 | 11/2016 |
| WO | 2016/207777 | 12/2016 |

OTHER PUBLICATIONS

International Search Report and Written Opinion corresponding to PCT/US2018/021916 (dated Sep. 4, 2018) (20 pages).

Janusziewicz et al. "Layerless fabrication with continuous liquid interface production" PNAS Early Edition, 113 (42):11703-11708 (2016).

O'Neal, Bridget , "Make Your Marketing Tangible with 3D Printed QR Codes", 3D Print.com; retrieved from: https://3dprint.com/33028/3d-printed-qr-codes/ (3 pages), 2014.

Sanladerer, Thomas , "Bake your PLA arid have it outperform everything else!", YouTube Video retrieved from: https://www.youtube.com/watch?v=CZX8eHC7fws, 2016.

* cited by examiner

| FIGURE 2A. RESIN TYPE DATA. | |
|---|---|
| 1 | RIGID POLYURETHANE |
| 2 | FLEXIBLE POLYURETHANE |
| 3 | ELASTOMERIC POLYURETHANE |
| 4 | CYANATE ESTER |
| 5 | EPOXY |
| 6 | SILICONE |
| 7 | URETHANE METHACRYLATE |
| 8 | [OTHER] |

| FIGURE 2B. RESIN BATCH DATA. | |
|---|---|
| 1 | DATE OF MANUFACTURE |
| 2 | INGREDIENT DATA (*e.g.,* QC DATA) |
| 3 | MANUFACTURER IDENTITY |

| FIGURE 2C. RESIN DISPENSE DATA. | |
|---|---|
| 1 | DATE AND TIME OF DISPENSE |
| 2 | DISPENSE SPEED |
| 3 | DISPENSE VOLUME |
| 4 | CASSETTE ID |

| FIGURE 3. ADDITIVE PRODUCTION DATA. | |
|---|---|
| 1 | OBJECT DATA INPUT (*e.g.*, .stl file) |
| 2 | DURATION |
| 3 | EXPOSURE INTENSITY |
| 4 | OPERATING MODE(S): Continuous, stepped, reciprocal, combination, etc. |
| 5 | MACHINE IDENTITY |
| 6 | TIME AND DAY OF PRODUCTION |
| 7 | BUILD PLATE IDENTITY (WINDOW) |
| 8 | BUILD PLATE USE HISTORY |
| 9 | OPERATOR IDENTITY |

| FIGURE 5. WASH PROGRAM OPTIONS ||||
|---|---|---|---|
| | AGITATION INTENSITY |||
| DURATION | | MILD | MEDIUM | AGGRESIVE |
| | SHORT | 1 | 2 | 3 |
| | MEDIUM | 4 | 5 | 6 |
| | LONG | 7 | 8 | 9 |

| FIGURE 6. WASH STEP DATA. | |
|---|---|
| 1 | TIME SINCE PRODUCTION |
| 2 | WASH LIQUID IDENTITY |
| 3 | WASH PROGRAM |
| 4 | MACHINE IDENTITY |
| 5 | OPERATOR IDENTITY |
| 6 | TIME AND DAY OF WASH |

| FIGURE 7. SECOND CURE PROGRAM OPTIONS | | | | |
|---|---|---|---|---|
| | | EXPOSURE (*E.G.*, HEAT) INTENSITY | | |
| | | MILD | MEDIUM | HOT |
| DURATION | SHORT | 1 | 2 | 3 |
| | MEDIUM | 4 | 5 | 6 |
| | LONG | 7 | 8 | 9 |

| FIGURE 8. CURE PROGRAM DATA. | |
|---|---|
| 1 | TIME SINCE PRODUCTION AND/OR WASH |
| 2 | MACHINE IDENTITY. |
| 3 | CURE PROGRAM. |
| 4 | OPERATOR IDENTITY. |
| 5 | OPERATOR IDENTITY. |
| 6 | TIME AND DAY OF CURE. |

| FIGURE 12. INDIVIDUAL PRODUCT REPORT: SYSTEM VERSION ||
|---|---|
| A: RESIN SELECTION. ||
| A1 | Resin type. |
| A2 | Resin batch data (*e.g.*, date of manufacture). |
| A3 | Resin dispense data (*e.g.*, date of dispense). |
| B: ADDITIVE PRODUCTION STEP. ||
| B1 | Build plate (cassette) identity. |
| B2 | Duration. |
| B3 | Exposure intensity. |
| B4 | Operating mode. |
| B5 | Resin post-dispense age (*e.g.*, pot life) |
| B6 | Object data input (.*e.g.*, .stl file) |
| B7 | Time of production (date and time of day) |
| C: WASH STEP. ||
| C1 | Wash liquid type. |
| C2 | Wash liquid age (resin load). |
| C3 | Wash cycle parameters (*e.g.*, duration, intensity) |
| C4 | Time of wash (date and time of day) |
| D: CURE STEP (*e.g.*, bake step). ||
| D1 | Duration. |
| D2 | Intensity. |
| D3 | Time of cure (date and time of day) |
| D4 | Additional parameters (*e.g.*, multi-step, cool-down, etc.) |
| E. FINAL POST-PROCESSING. ||
| E1 | Quality control inspector identity. |
| F: END USER FEEDBACK. ||
| F1 | Initial purchaser registration. |
| F2 | Survey-elicited feedback (individual and compiled). |
| F3 | User-volunteered feedback individual and compiled). |

INTEGRATED ADDITIVE MANUFACTURING SYSTEMS

CROSS-REFERENCE TO RELATED APPLICATIONS

This application is a 35 U.S.C. § 371 national phase application of International Application Serial No. PCT/US2018/021916, filed Mar. 12, 2018, which claims priority to U.S. Provisional Application Ser. No. 62/471,675, filed Mar. 15, 2017, U.S. Provisional Application Ser. No. 62/506,247, filed May 15, 2017, and U.S. Provisional Application Ser. No. 62/596,952, filed Dec. 11, 2017, the disclosures of which are hereby incorporated by reference in their entirety.

TECHNICAL FIELD

The present invention concerns additive manufacturing, and particularly concerns methods, apparatus, and systems for additive manufacturing in which multiple operations are performed in an integrated fashion.

BACKGROUND

The production of three-dimensional objects from polymerizable resins by stereolithography has been known for some time (see, e.g., U.S. Pat. No. 5,236,637 to Hull). Unfortunately, such techniques have been generally considered slow, and are typically limited to resins that produce brittle or fragile objects suitable only as prototypes. A more recent technique known as continuous liquid interface production (CLIP) allows both more rapid production of objects by stereolithography (see, e.g., U.S. Pat. No. 9,205,601 to DeSimone et al.), and the production of parts with isotropic mechanical properties (see R. Janusziewcz et al., Layerless fabrication with continuous liquid interface production, Proc. Natl. Acad. Sci. USA 113, 11703-11708, Oct. 18, 2016). Along with the more recent introduction of a variety of different dual cure resins for stereolithography (particularly CLIPs; see, e.g., U.S. Pat. No. 9,453,142 to Rolland et al.), these developments make possible the production of a much greater variety of functional, useful, objects suitable for real world use.

Current systems for additive manufacturing tend to be tailored towards prototyping—the making of small numbers of models that can be used to decide whether to invest in a high-volume manufacturing technique like injection molding—rather than towards the larger volume of real-world parts themselves. Accordingly, there is a need for new systems which make possible higher volume production of functional parts by additive manufacturing.

SUMMARY

Some embodiments of the invention are directed to an integrated additive manufacturing system, including: (a) at least one resin supply; (b) a plurality of additive manufacturing machines on which parts may be produced, each of the additive manufacturing machines operatively associated with the at least one resin supply; and (c) at least one peripheral machine operatively associated with each of the additive manufacturing machines and the at least one resin supply.

In some embodiments, the at least one resin supply includes a single-use (e.g., cartridge) resin supply or a bulk resin supply, each of which can be associated with either one of or a plurality of the additive manufacturing machines, and each of which can optionally include an automated resin feed system configured to supply resin to one of, or a plurality of, the additive manufacturing machines.

In some embodiments, the at least one peripheral machine includes: at least one part post-production machine, such as at least one of a part washing machine, a part penetrant bath apparatus (e.g. for impregnating an additional polymerizable component into a part after additive manufacturing but before further or subsequent cure), a part oven, a part cutting, grinding, and/or texturing machine (e.g., bead blasting, milling, tumbling, etc.), a part painting machine, or a combination thereof; and/or at least one maintenance machine configured to maintain or replace a component of the additive manufacturing machines, such as a build plate (or "window") cleaning machine (for example, when the additive manufacturing machines each include an optically transparent build plate, configured to be releasably secured to the additive manufacturing machine).

In some embodiments, the at least one peripheral machine includes a part washing machine.

In some embodiments, the system further includes: (d) a database operatively associated with each of the plurality of additive manufacturing machines, the database configured to record part configuration data for each part produced on each additive manufacturing machine.

The database may be further configured to contain specific resin data for each of a plurality of different resins. The at least one resin supply may include a resin container (e.g., a bulk container or a single use container) having a resin therein and a resin unique identifier (e.g., a bar code) operatively associated therewith, with the resin unique identifier associated with specific resin data for the contained resin. Each of said plurality of additive manufacturing machines may include a resin unique identifier reader operatively associated therewith and a resin reservoir configured to receive resin from the resin container. Each of the plurality of additive manufacturing machines may be configured to carry out a part production process with said resin based on both part configuration data (e.g., an .stl file) and the specific resin data.

Each of the additive manufacturing machines may include a releasable carrier plate on which a part is produced from the resin, with each of the carrier plates having a carrier plate unique identifier (e.g., an NFC tag) operatively associated therewith. The database may be further configured to record both part configuration data and resin data, and optionally but preferably time of production, for each part produced on each carrier plate. The part washing machine may include a carrier plate unique identifier reader operatively associated therewith. The part washing machine may be configured to select and carry out a part washing process on each part from a plurality of different part washing processes (optionally but preferably while each part remains on the carrier plate on which the part was produced) based on: (i) part configuration data, (ii) specific resin data, or (iii) both part configuration data and specific resin data. The database may optionally but preferably be configured to record washing process data, and optionally but preferably time of wash, for each part washed in the part washing machine.

In some embodiments, at least one of the peripheral machines (e.g., the part washing machine) is configured to releasably secure said carrier plate.

In some embodiments, the system further includes: (e) an oven operatively associated with each additive manufacturing machine. The oven may be optionally configured to select and carry out a baking process on each part from a plurality of different baking processes (optionally but preferably while each part remains on the carrier plate on which the part was produced) based on: (i) part configuration data, (ii) specific resin data, or (iii) both part configuration data and specific resin data. The database may be optionally but preferably configured to record baking process data, and optionally but preferably time of bake, for each part baked in the oven.

In some embodiments, each of the additive manufacturing machines is configured to apply a part unique identifier (e.g., an alphanumeric identifier) to each part produced thereon. The database further may be configured to record the part unique identifier from each of the additive manufacturing machines.

In some embodiments, each of the additive manufacturing machines includes an interchangeable build plate, with the build plate including an optically transparent member and a build plate unique identifier (e.g., a second NFC tag). Each of the plurality of additive manufacturing machines may further include a build plate unique identifier reader. The database may be further configured to record build plate data for each part produced on each of the plurality of additive manufacturing machines.

Some other embodiments of the invention are directed to an integrated method for producing and washing parts by additive manufacturing, including: (a) providing a manufacturing system including a plurality of additive manufacturing machines operatively associated with a part washing machine, with the part washing machine configured to execute a plurality of different wash programs; (b) generating at least one part on each of the plurality of additive manufacturing machines to produce a batch of parts to be washed, each part of the batch produced from a resin and from part configuration data, and with each part having residual resin thereon; and (c) washing each of the plurality of parts in the part washing machine with the same wash liquid in a plurality of consecutive wash programs for each part, each wash program configured or selected based on: (i) part configuration data, (ii) specific resin data, or (iii) both part configuration data and specific resin data; (d) optionally, but in some embodiments preferably, fixing each said plurality of parts as a first part to a respective additional part to form a composite article of each thereof; and then (e) optionally, but preferably, further curing (e.g., by heating) each of said plurality of parts.

In some embodiments, each part is produced in step (b) on a carrier platform that includes a carrier unique identifier (e.g., a bar code, NFC tag or RFID tag), and each washing step is carried out with the part on the carrier platform on which it was produced, and the wash program is configured or selected based upon information associated with said carrier unique identifier.

In some embodiments, each of the consecutive wash programs for each part is carried out in a total time of not more than 1, 2, 5 or 10 minutes. In some embodiments, each wash program for each part is carried out in a sequence of (i) agitating (e.g., spinning) the part in wash liquid, (ii) separating or draining wash liquid from the part, (iii) agitating (e.g., spinning) the part free of wash liquid to further separate residual resin; and (iv) optionally but preferably repeating steps (i) through (iii) at least once, all optionally but preferably in the same vessel, and all optionally with the same wash liquid.

In some embodiments, the residual resin has a boiling point of at least 90 or 100° C. (e.g., up to 250 or 300° C., or more), and the wash liquid has a boiling point of from 30° C. to 80 or 90° C.

In some embodiments, the wash liquid includes an organic solvent (e.g., a halogenated organic solvent, such as a fluorinated organic solvent, a siloxane solvent, etc.). The organic solvent may include an azeotropic mixture comprised of at least a first organic solvent (e.g., a hydrofluorocarbon solvent, a hydrochlorofluorocarbon solvent, a hydrofluoroether solvent, a methylsiloxane solvent, or a combination thereof; e.g., in an amount of from 80 or 85 to 99 percent by weight) and a second organic solvent (e.g., a C1-C4 or C6 alcohol such as methanol, ethanol, isopropanol, text-butanol, etc.; e.g., in an amount of from 1 to 15 or 20 percent by weight).

In some embodiments, the method includes recording at least one, any combination, or all of wash liquid type, wash liquid batch, wash liquid usage history, day of wash, time of day of wash, wash machine identity, wash liquid temperature, wash program, interval between additive production and wash, and/or wash machine operator, in association with each part (e.g., through a unique identifier on or associated with each part, and a unique identifier reader associated with said part washing machine).

Some other embodiments of the invention are directed to an integrated method for producing and baking parts by additive manufacturing, including: (a) providing a manufacturing system including a plurality of additive manufacturing machines operatively associated with an oven, and optionally with a part washing machine, with the oven configured to execute a plurality of different bake programs; (b) generating at least one part on each of the plurality of additive manufacturing machines to produce a batch of parts to optionally be washed, each part of the batch produced from a resin and from part configuration data; (c) optionally washing each of the plurality of parts in the part washing machine; (d) optionally, but in some embodiments preferably, fixing each said plurality of parts as a first part to a respective additional part to form a composite article of each thereof; and then (e) baking each of the plurality of parts, sequentially or simultaneously in the oven, with each of the parts baked in accordance with a bake program selected or configured based on (i) part configuration data, (ii) specific resin data, or (iii) both part configuration data and specific resin data.

In some embodiments, the step of washing each of the plurality of parts is included and carried out with the same wash liquid in accordance with a plurality of consecutive wash programs for each part, each wash program selected or configured based on: (i) part configuration data, (ii) specific resin data, or (iii) both part configuration data and specific resin data.

In some embodiments, the oven includes a batch oven (optionally including a lock assembly and/or an alarm, and the baking step optionally further includes locking said oven for the duration of said bake program, and/or activating said alarm upon deviation by the oven from the bake program).

In some embodiments, the oven includes a continuous process (e.g., conveyor) oven (optionally including a temperature monitor, and the oven optionally includes a shutdown and/or alarm configured to operate upon deviation by the oven from the bake program).

In some embodiments, the method includes recording at least one, any combination, or all of oven identity, bake program, day of bake, time of day of bake, and/or oven operator, interval between additive production and bake, and/or interval between wash and bake, and/or wash machine operator, in association with each part (e.g., through a unique identifier on or associated with each part, and a unique identifier reader associated with the oven).

Some other embodiments of the invention are directed to a method of tracking production of parts from a resin, including: (a) providing a database including resin data, the resin data including: (i) at least one resin type data, and (ii) resin batch data for each of a plurality of batches of each resin type; (b) producing a plurality of parts from one resin type and from part configuration data (e.g., an .stl file) with at least one additive manufacturing machine by a part production process, each of the parts having a part unique identifier applied thereto; (c) generating in the database a part record for each of the parts, the part record including resin type data, resin batch data, part production process data, and part unique identifier, the part record optionally including or excluding part configuration data.

In some embodiments, the method further includes the step of: (d) washing each part in a washing machine with a wash liquid in accordance with a wash cycle, and also adding wash cycle data and wash liquid data to each part record for each part washed.

In some embodiments, the method further includes the step of: (f) baking each part in an oven in accordance with a bake cycle and also adding bake cycle data to each part record for each part baked.

In some embodiments, the method includes generating a report from the database for at least one selected part based on said part unique identifier, said report including, for each selected part, at least one, or any combination, or all of: (i) resin type data, resin batch data, resin manufacturer identity; and/or (ii) part configuration data, part production program data, part production machine identity, build plate identity, time of part production, interval between resin manufacture and part production, interval between resin dispensing (and/or blending, for example for dual precursor resins) and part production, part production machine operator identity; and/or (iii) wash program data, wash liquid data, wash liquid batch, wash machine identity, time of wash, interval between time of production and time of wash, wash machine operator identity; and/or (iv) bake program data, time of bake, oven identity, interval between wash and bake, interval between additive production and bake, and/or oven operator identity.

In some embodiments, the method includes generating a report from the database for all parts sharing at least one, or any combination of, or all of, the same: (i) resin type data, resin batch data, resin manufacturer identity; and/or (ii) part configuration data, part production program data, part production machine identity, build plate identity, time of part production, interval between resin manufacture and part production, interval between resin dispensing (and/or blending, for example for dual precursor resins) and part production, part production machine operator identity; and/or (iii) wash program data, wash liquid data, wash liquid batch, wash machine identity, time of wash, interval between time of production and time of wash, wash machine operator identity; and/or (iv) bake program data, time of bake, oven identity, interval between wash and bake, interval between additive production and bake, and/or oven operator identity.

Also described herein is a method of making a composite article by additive manufacturing, comprising: (a) producing a first part from a dual cure resin by additive manufacturing (e.g., by stereolithography, preferably by continuous liquid interface production); (b) washing the first part with a solvent (e.g., an organic solvent); then (c) fixing the first part to an additional part to form a composite article; and then (d) further curing, preferably by baking, the composite article, with the first part and the additional part pressed against one another during the further curing step with force sufficient to adhere each to the other.

Some other embodiments of the invention are directed to an integrated additive manufacturing system comprising: a processor; a data repository comprising a database configured to record part configuration data for a part produced by the integrated additive manufacturing system; an additive manufacturing machine configured to manufacture a part through additive manufacturing; and a memory coupled to the processor and comprising computer readable program code that when executed by the processor causes the processor to perform operations comprising: obtaining a part image sequence comprising instructions for additively manufacturing the part on the additive manufacturing system; generating a unique identifier associated with the part; and modifying the part image sequence to create a merged image sequence comprising instructions for generating a manufactured part on the additive manufacturing machine with a representation of the unique identifier contained on or within the manufactured part.

In some embodiments, the unique identifier includes alphanumeric characters and/or symbols.

In some embodiments, the operations further include obtaining a unique identifier image sequence comprising instructions for additively manufacturing the representation of the unique identifier on the additive manufacturing system, and modifying the part image sequence to create the merged image sequence includes merging the part image sequence and the unique identifier image sequence.

In some embodiments, the operations further include storing the unique identifier in the database.

In some embodiments, the operations further include manufacturing the part on the additive manufacturing machine using the merged image sequence.

In some embodiments, the operations further include storing part configuration data associated with the manufacturing of the part in the database.

In some embodiments, the part configuration data associated with the manufacturing of the part in the database includes resin data associated with a resin used to manufacture the part.

In some embodiments, the system includes a camera configured to optically capture the unique identifier contained on or within the manufactured part.

In some embodiments, the system includes a part washing machine, and the part washing machine is configured to select a wash program for the manufactured part based on the unique identifier associated with the part.

In some embodiments, the part configuration data contained in the database further includes wash data associated with the wash program used by the part washing machine.

In some embodiments, the system includes a curing machine, and the curing machine is configured to select a cure program for the manufactured part based on the unique identifier associated with the part.

In some embodiments, the part configuration data contained in the database further includes cure data associated with the cure program used by the curing machine.

In some embodiments, the manufactured part is a first manufactured part, the merged image sequence is a first merged image sequence, the unique identifier is a first unique identifier, and the operations further include: generating a second unique identifier associated with the part; and modifying the part image sequence to create a second merged image sequence, different from the first merged image sequence, said second merged image sequence comprising instructions for generating a second manufactured part on the additive manufacturing machine with a representation of the second unique identifier contained on or within the second manufactured part.

In some embodiments, the operations further include: associating a build plate identity of a build plate used to manufacture the part with the unique identifier associated with the part; and storing the build plate identity in the database.

Also described herein is a part manufactured using the integrated additive manufacturing system of the embodiments described herein.

Also described herein is a manufactured part including an additively-manufactured portion, wherein the additively-manufactured portion includes a unique identifier structurally incorporated into the additively-manufactured portion.

Further aspects of the present invention are explained in greater detail in the drawings herein and the specification below. The disclosures of all United States Patent references cited herein are to be incorporated herein by reference in their entirety.

BRIEF DESCRIPTION OF THE DRAWINGS

FIG. 2A lists one example of various different resin types that may be recorded in carrying out the present invention.

FIG. 2B lists one example of resin batch data that may be recorded in carrying out the present invention.

FIG. 2C lists one example of resin dispense data that may be recorded in carrying out the present invention.

FIG. 3 lists one example of additive manufacture production data that may be recorded in carrying out the present invention.

FIG. 5 is a non-limiting example of different wash program options that may be carried out, and recorded, in the present invention.

FIG. 6 lists one example of wash step data that may be recorded in carrying out the present invention.

FIG. 7 is a non-limiting example of different further cure (bake) program options that may be carried out, and recorded, in the present invention.

FIG. 8 lists one example of cure step data that may be recorded in carrying out the present invention.

FIG. 12 schematically illustrates one example of a tracking report for an object, generated in accordance with the present invention.

DETAILED DESCRIPTION

Figure 1A:
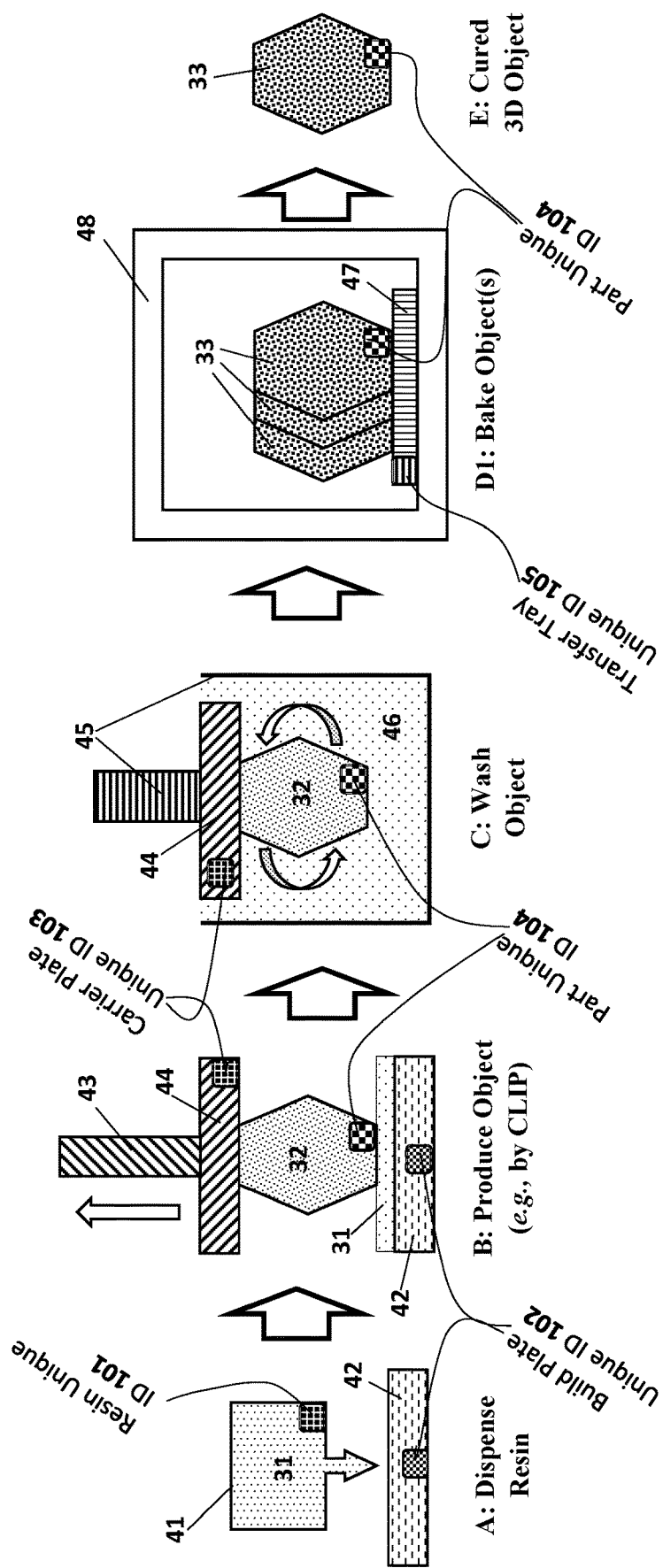
FIG. 1A schematically illustrates one embodiment of a process of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Polymerizable Liquids (Resins).

Numerous resins for use in additive manufacturing are known and can be used in carrying out the present invention. See, e.g., U.S. Pat. No. 9,205,601 to DeSimone et al. Indeed, a feature of the present invention is to accommodate the potential use of different resins in a single additive manufacturing system.

In some embodiments, the additive manufacturing step is formed from a dual cure resin. Such resins are described in, for example, J. Rolland et al., PCT Applications PCT/US2015/036893 (see also US Patent Application Pub. No. US 2016/0136889), PCT/US2015/036902 (see also US Patent Application Pub. No. US 2016/0137838), PCT/US2015/036924 (see also US Patent Application Pub. No. US 2016/016077), and PCT/US2015/036946 (see also U.S. Pat. No. 9,453,142).

Resins may be in any suitable form, including "one pot" resins and "dual precursor" resins (where cross-reactive constituents are packaged separately).

Particular examples of suitable resins include, but are not limited to, Carbon, Inc. rigid polyurethane resin (RPU), flexible polyurethane resin (FPU), elastomeric polyurethane resin (EPU), cyanate ester resin (CE), epoxy resin (EPX), or urethane methacrylate resin (UMA), all available from Carbon, Inc., 1089 Mills Way, Redwood City, Calif. 94063 USA.

Note that, in some embodiments employing "dual cure" polymerizable resins, the part, following manufacturing, may be contacted with a penetrant liquid, with the penetrant liquid carrying a further constituent of the dual cure system, such as a reactive monomer, into the part for participation in a subsequent cure.

2. Additive Manufacturing Methods and Apparatus.

The three-dimensional intermediate to be washed is preferably formed from polymerizable resins by additive manufacturing, typically bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, US Patent Application Publication No. 2013/0292862 to Joyce, US Patent Application Publication No. 2013/0295212 to Chen et al., and M. Shusteff et al., One-step volumetric additive manufacturing of complex polymer structures, Science Advances (published December 2017). The disclosures of these patents, applications, and publication are incorporated by reference herein in their entirety.

In general, top-down three-dimensional fabrication is carried out by:

(a) providing a polymerizable liquid reservoir having a polymerizable liquid fill level and a carrier positioned in the reservoir, the carrier and the fill level defining a build region therebetween;

(b) filling the build region with a polymerizable liquid (i.e., the resin), said polymerizable liquid comprising a mixture of (i) a light (typically ultraviolet light) polymerizable liquid first component, and (ii) a second solidifiable component of the dual cure system; and then (c) irradiating the build region with light to form a solid polymer scaffold from the first component and also advancing (typically lowering) the carrier away from the build surface to form a three-dimensional intermediate having the same shape as, or a shape to be imparted to, the three-dimensional object and containing said second solidifiable component (e.g., a second reactive component) carried in the scaffold in unsolidified and/or uncured form.

A wiper blade, doctor blade, or optically transparent (rigid or flexible) window, may optionally be provided at the fill level to facilitate leveling of the polymerizable liquid, in accordance with known techniques. In the case of an optically transparent window, the window provides a build surface against which the three-dimensional intermediate is formed, analogous to the build surface in bottom-up three-dimensional fabrication as discussed below.

In general, bottom-up three-dimensional fabrication is carried out by:

(a) providing a carrier and an optically transparent member having a build surface, the carrier and the build surface defining a build region therebetween;

(b) filling the build region with a polymerizable liquid (i.e., the resin), said polymerizable liquid comprising a mixture of (i) a light (typically ultraviolet light) polymerizable liquid first component, and (ii) a second solidifiable component of the dual cure system; and then (c) irradiating the build region with light through said optically transparent member to form a solid polymer scaffold from the first component and also advancing (typically raising) the carrier away from the build surface to form a three-dimensional intermediate having the same shape as, or a shape to be imparted to, the three-dimensional object and containing said second solidifiable component (e.g., a second reactive component) carried in, the scaffold in unsolidified and/or uncured form.

In some embodiments of bottom-up or top-down three-dimensional fabrication as implemented in the context of the present invention, the build surface is stationary during the formation of the three-dimensional intermediate; in other embodiments of bottom-up three-dimensional fabrication as implemented in the context of the present invention, the build surface is tilted, slid, flexed and/or peeled, and/or otherwise translocated or released from the growing three-dimensional intermediate, usually repeatedly, during formation of the three-dimensional intermediate.

In some embodiments of bottom-up or top-down three-dimensional fabrication as carried out in the context of the present invention, the polymerizable liquid (or resin) is maintained in liquid contact with both the growing three-dimensional intermediate and the build surface during both the filling and irradiating steps, during fabrication of some of, a major portion of, or all of the three-dimensional intermediate.

In some embodiments of bottom-up or top-down three-dimensional fabrication as carried out in the context of the present invention, the growing three-dimensional intermediate is fabricated in a layerless manner (e.g., through multiple exposures or "slices" of patterned actinic radiation or light) during at least a portion of the formation of the three-dimensional intermediate.

In some embodiments of bottom-up or top-down three-dimensional fabrication as carried out in the context of the present invention, the growing three-dimensional intermediate is fabricated in a layer-by-layer manner (e.g., through multiple exposures or "slices" of patterned actinic radiation or light), during at least a portion of the formation of the three-dimensional intermediate.

In some embodiments of bottom-up or top-down three-dimensional fabrication employing a rigid or flexible optically transparent window, a lubricant or immiscible liquid may be provided between the window and the polymerizable liquid (e.g., a fluorinated fluid or oil such as a perfluoropolyether oil).

From the foregoing it will be appreciated that, in some embodiments of bottom-up or top-down three-dimensional fabrication as carried out in the context of the present invention, the growing three-dimensional intermediate is fabricated in a layerless manner during the formation of at least one portion thereof, and that same growing three-dimensional intermediate is fabricated in a layer-by-layer manner during the formation of at least one other portion thereof. Thus, operating mode may be changed once, or on multiple occasions, between layerless fabrication and layer-by-layer fabrication, as desired by operating conditions such as part geometry.

In some embodiments, the intermediate is formed by continuous liquid interface production (CLIP). CLIP is known and described in, for example, PCT Application Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as U.S. Pat. No. 9,216,546 on Dec. 22, 2015), A. Ermoshkin et al., Three-dimensional printing with reciprocal feeding of polymerizable liquid, PCT/US2015/195924 (also published as US Patent Application Pub. No. US 2017/0173871 on Jun. 22, 2017); P. Sutter et al., Fabrication of three dimensional objects with multiple operating modes, PCT/US2016/140886 (also published as US Patent Application Pub. No. US20180022034 on Jan. 25, 2018) and in J. Tumbleston, D. Shirvanyants, N. Ermoshkin et al., Continuous liquid interface production of 3D Objects, Science 347, 1349-1352 (published online 16 Mar. 2015). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson, E. Samulski et al., Continuous three dimensional fabrication from immiscible liquids, WO 2015/164234, published Oct. 29, 2015; also published as US Patent Application Pub. No. US 2017/0228618 on Feb. 2, 2017)), generating oxygen as an inhibitor by electrolysis (see I. Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

Other examples of methods and apparatus for carrying out CLIP include, but are not limited to: Batchelder et al., Continuous liquid interface production system with viscosity pump, US Patent Application Pub. No. US 2017/0129169 (May 11, 2017); Sun and Lichkus, Three-dimensional fabricating system for rapidly producing objects, US Patent Application Pub. No. US 2016/0288376 (Oct. 6, 2016); Willis et al., 3d print adhesion reduction during cure process, US Patent Application Pub. No. US 2015/0360419 (Dec. 17, 2015); Lin et al., Intelligent 3d printing through optimization of 3d print parameters, US Patent Application Pub. No. US 2015/0331402 (Nov. 19, 2015); and D. Castanon, Stereolithography System, US Patent Application Pub. No. US 2017/0129167 (May 11, 2017).

In some cases, objects formed by additive manufacturing from resins as described above have residual, unpolymerized or partially polymerized, resin on the surface thereof, which must be cleaned or washed from the object, as described further below.

3. Wash Liquids.

Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

In some preferred embodiments, where the residual resin has a boiling point of at least 90 or 100° C. (e.g., up to 250 or 300° C., or more), the wash liquid has a boiling point of at least 30° C., but not more than 80 or 90° C. Boiling points are given herein for a pressure of 1 bar or 1 atmosphere.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009).

In some embodiments, the wash liquid can be an aqueous solution of ethoxylated alcohol, sodium citrate, tetrasodium N,N-bis(carboxymethyl)-L-glutamate, sodium carbonate, citric acid, and isothiazolinone mixture. One particular example thereof is SIMPLE GREEN® all purpose cleaner (Sunshine Makers Inc., Huntington Beach, Calif., USA), used per se or mixed with additional water.

In some embodiments, the wash liquid can be an aqueous solution comprised of 2-butoxyethanol, sodium metasilicate, and sodium hydroxide. One articular example thereof is PURPLE POWER™ degreaser/cleaner (Aiken Chemical Co., Greenville, S.C., USA), used per se or mixed with additional water.

In some embodiments, the wash liquid can be ethyl lactate, alone or with a co-solvent. One particular example thereof is BIO-SOLV™ solvent replacement (Bio Brands LLC, Cinnaminson, N.J., USA), used per se or mixed with water.

In some embodiments, the wash liquid consists of a 50:50 (volume:volume) solution of water and an alcohol organic solvent such as isopropanol (2-propanol).

Examples of hydrofluorocarbon solvents that may be used to carry out the present invention include, but are not limited to, 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.

Examples of hydrochlorofluorocarbon solvents that may be used to carry out the present invention include, but are not limited to, 3,3-Dichloro-1,1,1,2,2-pentafluoropropane, 1,3-Dichloro-1,1,2,2,3-pentafluoropropane, 1,1-Dichloro-1-fluoroethane, etc., including mixtures thereof.

Examples of hydrofluoroether solvents that may be used to carry out the present invention include, but are not limited to, methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc., including mixtures thereof. Commercially available examples of this solvent include Novec 7100 (3M), Novec 7200 (3M).

Examples of volatile methylsiloxane solvents that may be used to carry out the present invention include, but are not limited to, hexamethyldisiloxane (OS-10, Dow Corning), octamethyltrisiloxane (OS-20, Dow Corning), decamethyltetrasiloxane (OS-30, Dow Corning), etc., including mixtures thereof.

Other siloxane solvents (e.g., NAVSOLVE™ solvent) that may be used to carry out the present invention include but are not limited to those set forth in U.S. Pat. No. 7,897,558.

In some embodiments, the wash liquid comprises an azeotropic mixture comprising, consisting of, or consisting essentially of a first organic solvent (e.g., a hydrofluorocarbon solvent, a hydrochlorofluorocarbon solvent, a hydrofluoroether solvent, a methylsiloxane solvent, or a combination thereof; e.g., in an amount of from 80 or 85 to 99 percent by weight) and a second organic solvent (e.g., a C1-C4 or C6 alcohol such as methanol, ethanol, isopropanol, tert-butanol, etc.; e.g., in an amount of from 1 to 15 or 20 percent by weight). Additional ingredients such as surfactants or chelants may optionally be included. In some embodiments, the azeotropic wash liquid may provide superior cleaning properties, and/or enhanced recyclability, of the wash liquid. Additional examples of suitable azeotropic wash liquids include, but are not limited to, those set forth in U.S. Pat. Nos. 6,008,179; 6,426,327; 6,753,304; 6,288,018; 6,646,020; 6,699,829; 5,824,634; 5,196,137; 6,689,734; and 5,773,403, the disclosures of which are incorporated by reference herein in their entirety.

4. Wash Methods and Apparatus.

Apparatus for washing parts produced by additive manufacturing are known, and can be modified for use in the present invention in accordance with known techniques. (see, e.g., U.S. Pat. Nos. 5,248,456; 5,482,659, 6,660,208; 6,996,245; and 8,529,703). However, many such part washers are not adapted to cleaning larger numbers of more diverse parts having much more diverse material properties. Hence, overall wash speed is preferably accelerated by employing higher volume liquid exchange pumps, and/or pneumatic liquid exchange, rapid draining of fluids such as by gravity-assist, more aggressive agitation, such as by spinning the objects to be cleaned in the wash liquid (e.g., while still mounted on the carrier plate on which they were produced), by including "dry" steps, such as by draining the wash liquid and spinning the object in air to centrifugally remove residual resin and wash liquid from the object, optionally by re-immersing the object in the wash liquid and repeating the wash program, etc. Additional agitation sources, such as ultrasonic agitation, can also be provided.

5. Fixturing Apparatus and Methods.

As disintermediation has become important in simplifying supply chains and other economic transactions, so to has the simplification of assembly lines become important in manufacturing. Processes such as heat staking, adhesive and/or sealant dispensing and curing, and vibration or ultrasonic welding component parts together, add complexity and expense to many manufacturing processes. The present invention allows simplification of such processes by largely consolidating them with the bonding potential of the green parts and the heat curing step, by simply fixing at least one additional component part to a green, additively manufactured, component part prior to heat curing.

Figure 13:
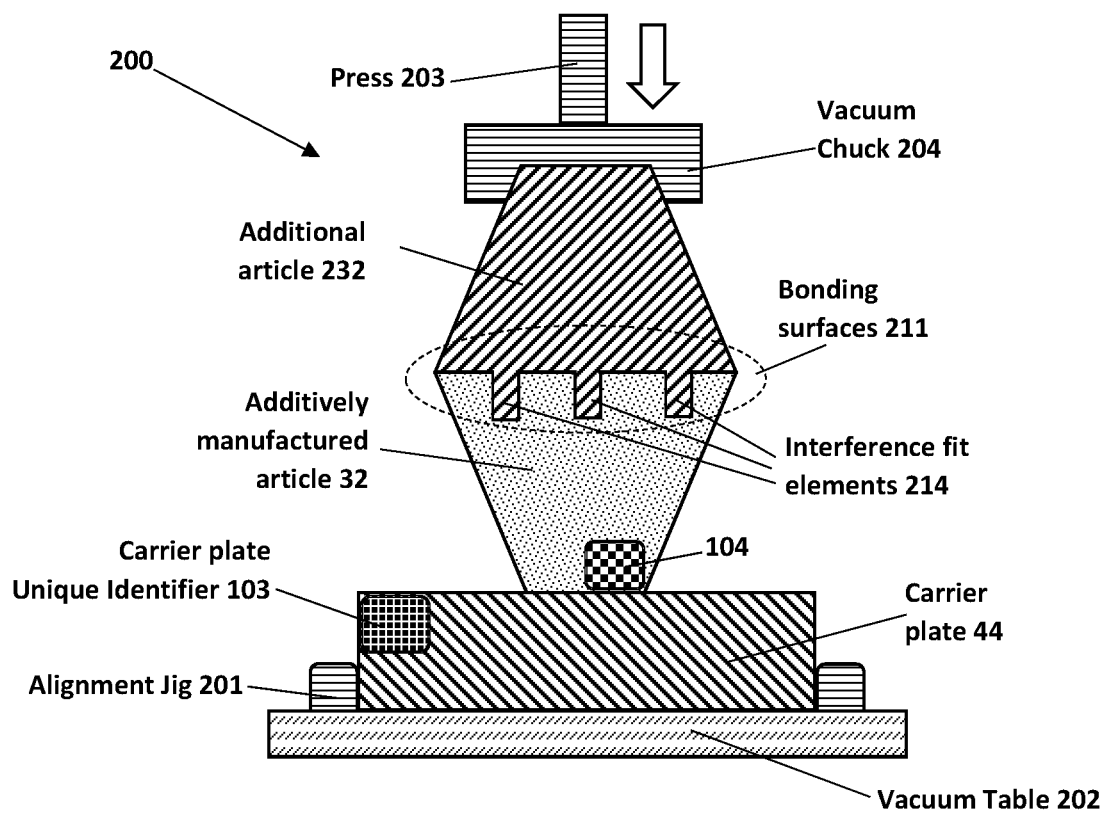
FIG. 13 schematically illustrates one example of a fixturing station of the present invention, in which a pre-formed component is fixed or joined to the additively manufactured component, before or after wash, preferably after wash, and preferably before heat cure of the additively manufactured component in an oven.

A non-limiting example of a fixturing apparatus (200) for use in the present invention is schematically illustrated in FIG. 13. In general, a fixturing station or apparatus may include an alignment assembly (typically at least one guide (such as an alignment jig (201)), clamp (including mechanical and suction clamps such as a vacuum table (202)), or combination thereof) for receiving and securing a first component part (32), operatively associated with a suitable joining assembly (e.g., a chuck such as a pneumatic chuck for stretching and releasing a part; a press (203) such as a robotic arm, a mechanical, hydraulic or pneumatic press, etc., optionally fitted with a vacuum chuck (204); etc., including combinations of the foregoing) for contacting at least one additional component part (232) to the first part after the first part has been received or secured into the alignment assembly. Pressure across the bonding surfaces (211) can be maintained throughout the further curing or baking process by any suitable means, such as by clamping fixtures that clamp the components together, by internal locking forces between the parts (such as by interference fit (214)), by weight applied to the bonding surfaces (including external weights, and weight intrinsic to the object itself), etc., including combinations of the foregoing. The amount of pressure applied across the bonding surfaces will depend upon a variety of factors, such as the materials being bonded, the shape and smoothness of the surfaces, whether or not re-shaping of the additively manufactured part during the further curing is desired, etc. but in general will be from one half of a pound per square inch, or one pound per square inch, up to ten or twenty pounds per square inch (e.g., where no re-shaping is desired), or up to fifty or one hundred pounds per square inch or more (e.g., where re-shaping of the additively manufactured component part during further curing is desired).

Transfer of the component parts to and from the fixturing station can be carried out manually or with any suitable apparatus (such as a conveyor, shuttle, robotic arm, etc., including combinations thereof).

While the illustrative embodiment of FIG. 13 shows a press having a vacuum chuck positioned over a clamp assembly, an alternate embodiment would utilize a vacuum table fitted with an alignment jig positioned beneath a press, or either between a pneumatic chuck configured to stretch and release an additively manufactured component part onto another component part.

Either the first component part or the additional component part (or both) may be additively manufactured (e.g., by stereolithography, such as by CLIP). Where additively manufactured, the component parts may be retained on the carrier platform on which they were additively manufactured, or separated therefrom.

In some embodiments, one of the component parts (e g, the additional part) may be formed from a different material, and/or by a different technique, than the additively manufactured component part. Examples of suitable materials include, but are not limited to, metals (including metal alloys; e.g., steel, bronze, brass, iron, nickel, titanium, aluminum, etc.), inorganic materials (e.g., glass, ceramic, etc.), carbon fiber (e.g., carbon fiber composites), polymers (e.g., polycarbonate, polyethylene, etc.), and composites of the foregoing. Examples of suitable techniques include, but are not limited to, forging, casting, injection molding, machining, etc., including combinations thereof.

Numerous possible embodiments can be implemented, specific examples of which include, but are not limited to the following:

Fixing, by pressing, two different additively manufactured parts together. The different parts may be formed from different resins that have compatible chemistries and thermal cure schedules, e.g., an elastomeric polyurethane to a rigid polyurethane.

Fixing, by pressing, connectors, such as threaded metal inserts, into corresponding sockets in green, additively manufactured component part Fixing, by pressing, a green lattice structure formed by additive manufacturing on to one or more pre-formed, external, partial or complete, shell components, aluminum alloy, carbon fiber composites, etc.)

Fixing, by pressing, a green seal bead produced by additive manufacturing onto a pre-fabricated part to establish a face seal on that part.

Fixing, by stretching and releasing (e.g., with a pneumatic chuck) a green seal bead produced by additive manufacturing onto a pre-fabricated part to establish a radial seal on that part.

Note that many of the foregoing techniques can, when desired, re-shape the additively manufactured component part during the further curing or baking step: For example, from a "green" configuration that is optimized for the additive manufacturing step, to a configuration that is preferred for the finished composite article.

Fixing of component parts together may be carried out before or after washing of the additively manufactured part or parts (preferably after washing), and before or after other steps such as removal of supports from additively manufactured parts.

In a preferred embodiment, fixing of components parts together is carried out before a heating or baking step.

6. Further Curing (baking) Methods And Apparatus.

Further curing of the parts can be carried out by any suitable technique, but is typically carried out by heating may be active heating (e.g., in an oven, such as an electric, gas, solar oven or microwave oven, or combination thereof). Ovens (48) may be batch or continuous (conveyor) ovens, as is known in the art, although batch ovens are shown in the Figures herein for purposes of simplicity.

Conveyor ovens are in some embodiments preferred, including multi-zone conveyor ovens and multi-heat source conveyor ovens, and associated carriers for objects that can serve to provide more uniform or regular heat to the object being cured. The design of conveyor heating ovens, and associated controls, are well known in the art. See, e.g., U.S. Pat. Nos. 4,951,648; 5,179,265; 5,197,375; and 6,799,712.

In some embodiments, the heating (baking) step or program is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the resin chemistry, size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

In some embodiments, the oven may include a carousel or rotisserie for the objects, and/or a convection element, to facilitate uniform heating, In some embodiments, the oven may include a light source, such as an ultraviolet light source, to further light cure components therein, during the heat curing stage.

In some embodiments, the oven may include a gas source configured to purge the oven with an inert gas (e.g., nitrogen, argon) during baking of objects therein (to achieve depletion of ambient oxygen during baking of parts) at an atmospheric, elevated, or reduced pressure level; in other embodiments, the oven may include a gas source (e.g., compressed oxygen; an oxygen generator or concentrator) configured to enrich the atmosphere in the oven with oxygen during baking of objects therein; in still other embodiments, the oven may include both of the aforesaid gas sources. The choice of gas source and/or gas pressure, to achieve either oxygen depletion or oxygen enrichment during baking, may depend upon the particular resin from which the objects are produced.

Ovens will generally include a vent duct, connected to a venting system. In some embodiments, the vent includes a sensor or detector for detecting one or more vapors that are "out-gassed" from the objects being baked therein, such as solvents and/or diluents. The detector may be operatively associated with the systems described herein to provide data characterizing the objects, or provide an indication of when baking is complete (which may automatically stop the bake cycle). In addition, the vent may include a build-up or "choke" detector, to alert the user when the vent or vent system has an undesirable level of deposits thereon.

7. Additional Peripheral Machines.

While the present invention is described primarily with reference to part washing machines, fixturing stations, and ovens as devices peripheral to the additive manufacturing machines, other peripheral machines may also be used.

For example, pre-production machines, including resin dispenser and/or blending machines (as separately noted) when not a component of the additive manufacturing machine itself, may be included. In some embodiments, the resin dispenser and/or blending machines may be mobile resin dispenser and/or blending machines delivering resins to a fleet of additive manufacturing machines on demand.

Other pre-production machines, or maintenance machines, may also be included in the systems described herein. For example, when an interchangeable build plate (window or "cassette") is used, periodic cleaning thereof may be performed (e.g., by immersing in and/or scrubbing with a suitable solvent, such as isopropanol, or the wash liquids as described above). Such machines (71) may be implemented and automated in like manner as the part washing machines described herein (or in some cases the part washing machine can also serve as a cassette cleaning machine).

Additional examples of post-production machines that can be incorporated as peripheral apparatus in the systems and methods described herein include, but are not limited to, part penetrant bath apparatus (e.g., for impregnating an additional polymerizable component into a part after additive manufacturing, but before further or subsequent cure), part cutting, grinding, and/or finishing machines (e.g., bead blasting, milling, tumbling, painting, etc.).

Figure 10:
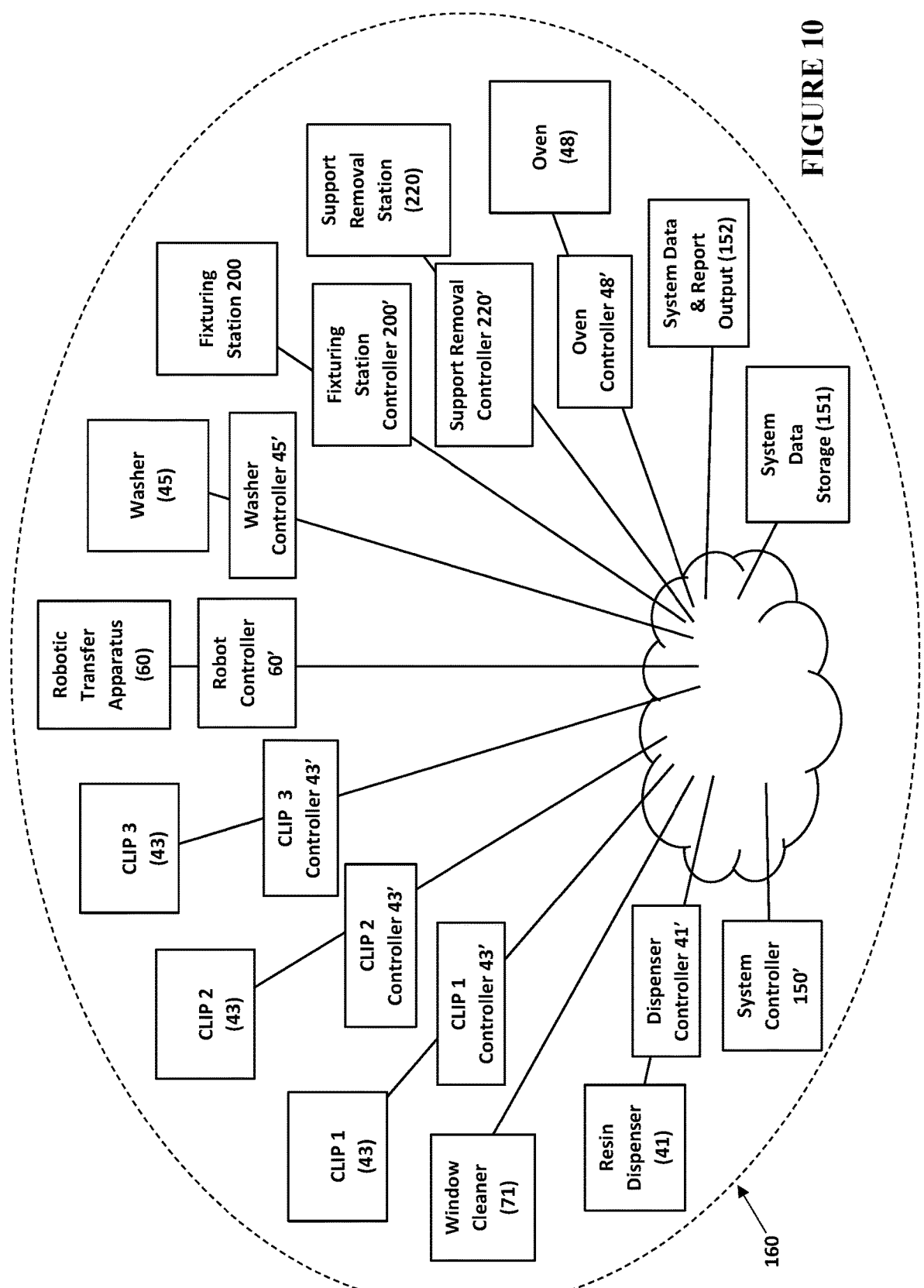
FIG. 10 schematically illustrates a second embodiment of an integrated system of the present invention.
Figure 14:
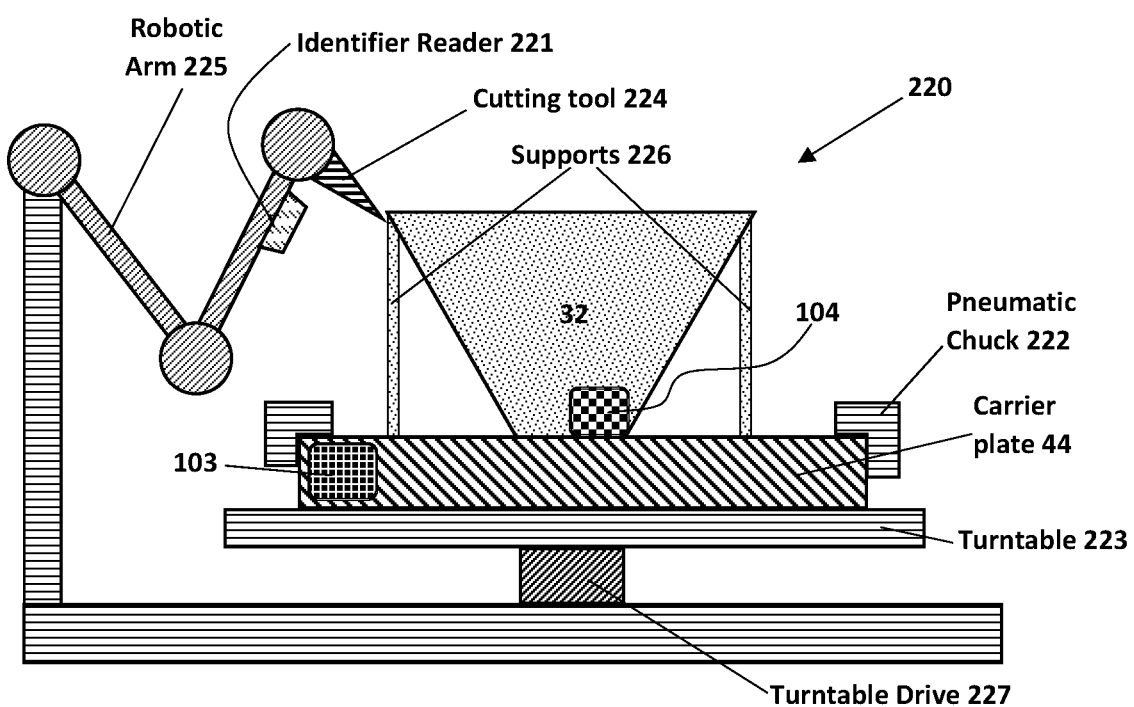
FIG. 14 schematically illustrates one example of an automated support removal station suitable for use in the systems of the present invention, in which station a tool mounted on a robotic arm removes supports based on known locations and characteristics of those supports.

Support removal apparatus. In a particular example, and as included in the embodiment of FIG. 10, a post-processing apparatus may be a support removal apparatus (220). Such an apparatus may include a part unique identifier reader and/or a build plate unique identifier reader (221), configured to identify the particular part (33) received by the apparatus. Such an apparatus may further include a clamp, guide and/or other suitable alignment components (e.g., a pneumatic chuck (222) on a turn-table (223) including a turntable drive (227) as shown in FIG. 14), to positively orient the part (optionally but in some embodiments preferably still mounted on the carrier plate (44)) in a known orientation, in response to instructions from a controller (220'). The controller may then be configured to select a tool from a range of tools, e.g., a cutting or grinding tool (224), such as a laser cutter for fitting onto a robotic arm (225), as shown in FIG. 14, guide the tool to appropriate locations and activate the tool to a predefined power setting to remove support structures (226) based on the known structure and characteristics, such as hardness, strength, toughness, softening point, of the object and support structures, thus obviating the need for optical detection and recognition of supports during their removal (though such may still be included if desired).

8. Unique Identifiers and Readers.

"Unique identifier" and "unique identifier reader" as used herein refer to components of an automatic identification and data capture system. Suitable unique identifiers include, but are not limited to, bar codes (including one-dimensional and two-dimensional bar codes), near field communication (NFC) tags, radio frequency identification (RFID) tags (including active, passive, and battery-assisted passive RFID tags), optical character recognition (OCR) tags and readers, magnetic strips and readers, etc. A variety of such systems are known and described in, for example, U.S. Pat. Nos. 8,120,468; 8,526,910; 9,373,201; 9,562,429; 9,576,476; 9,587,487; 9,589,428; and 9,595,058. Unique identifiers and their corresponding readers of various different types can be utilized at various points in the integrated system described herein, as discussed further below.

9. Integrated Systems.

Non-limiting examples of integrated systems and methods encompassed by the present invention are given in FIGS. 1-12 herein.

Figure 1B:
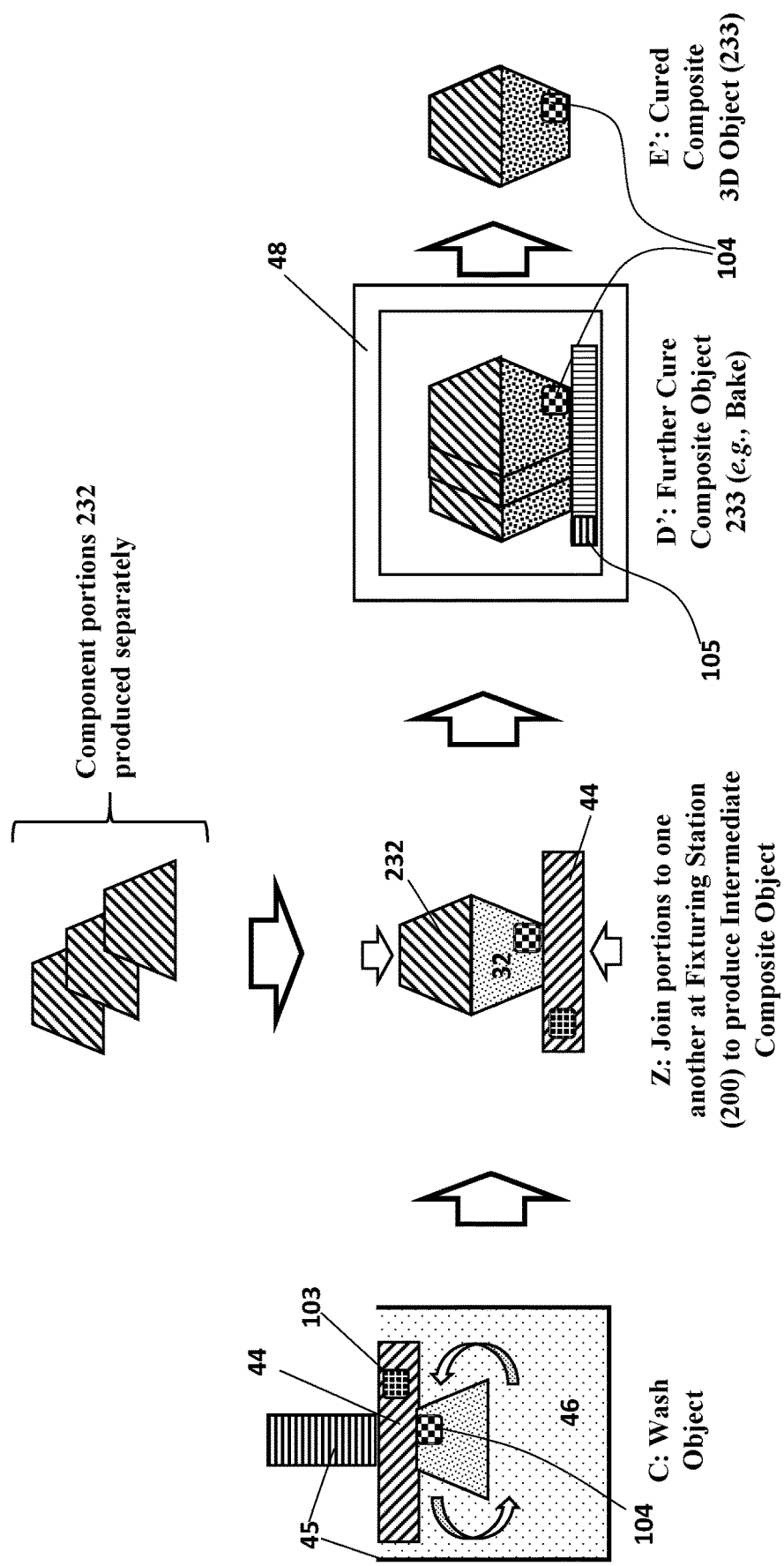
FIG. 1B schematically illustrates a portion of a second embodiment of a process of the present invention, similar to that of FIG. 1A, but now including a fixturing station.

As shown in FIGS. 1A-1B, it will be appreciated that different unique identifiers (101, 102, 103, 104, 105) can be used at different points in the systems and methods described herein. For example, an NFC tag, RFID tag, and/or bar code (101) may be most appropriate for placing on or associating with the resin container when the resin is manufactured, with the associated reader operatively associated with a resin dispenser or supply (41) system into which the resin (31) will be loaded by the resin user. The resin manufacturer can optionally utilize an associated reader, when the resin is manufactured, to enter into the database the resin type, batch ingredient data, and/or manufacturer identity (see, for example, FIGS. 2A-2B).

Similarly, where resin is dispensed into a movable build plate (42) (sometimes also referred to as a "window" or a "cassette") that is then transferred with the resin to an additive manufacturing machine, then an NFC tag, RFID tag, and/or bar code (102) might be most appropriate to associate with that build plate or cassette, with the associated reader at the resin dispenser (41) and/or at the additive manufacturing machine (43) configured to capture the build plate identity, and associate it with the resin data, in the database. Non-limiting examples of resin dispense data include that set forth in FIG. 2C. Thus "specific resin data" may include, for example, resin type data and resin batch data (non-limiting examples of which are given in FIGS. 2A-2B), optionally supplemented with resin dispense data (non-limiting examples of which are given in FIG. 2C).

When parts or objects (32) are additively manufactured on a removable carrier plate (44), the carrier plate may have its own appropriate unique identifier (103), such as an NFC tag, RFID tag, and/or bar code, with appropriate reader on the additive manufacturing machine (43) and the washing machine (45), to record additive production data (see, for example, FIG. 3).

Each part (32) produced on an additive manufacturing machine can also have its own unique identifier (104) (for example, a set of alphanumeric characters and/or symbols appearing on a surface or other location thereof), which can be imparted by any suitable technique, including, in the apparatus controller, a routine for modifying each product geometry data file just before and/or during part production, and recording the unique identifier in association with that part (along with, for example, other resin and part production data). A non-limiting example of such a routine is given in FIGS. 4A-4B, and as discussed further below. In some embodiments, modifying the product geometry data file may include incorporating the unique identifier into the product geometry data file so that the unique identifier is structurally incorporated in the manufactured part. As used herein, structurally incorporated means that the unique identifier is formed into the structure of the part during manufacture, in contrast to a unique identifier that is added post-production. For example, the unique identifier may be included (e.g., formed raised and/or recessed) in a surface of the manufactured part. In some embodiments, the unique identifier may be incorporated internally in the structure of the manufactured part so that it may not be immediately visible from an outer inspection of the part.

As noted previously, part washing machines (45) may be configured to execute a variety of different wash programs (as may best suit objects made in particular configurations and/or from particular resins), non-limiting examples of which are given in FIG. 5. When the part is to be washed on the carrier platform on which it was produced (as shown in FIG. 1), the washing machine can include an appropriate identifier reader for recording the part washed, and also recording part wash step data for that particular part (See, for example, FIG. 6). If the wash program is not pre-set (as may be the case for higher volume through-put of similar parts), then the wash machine can be configured to select the appropriate wash program for each part, based on information in the database on part configuration and/or resin type.

In some embodiments, the wash machine (45) can dynamically determine the appropriate wash program for a part based on reading the unique identifier associated with that part. The appropriate wash program may be based on the part geometry, part materials, and/or other information retrieved using the unique identifier. In some embodiments, the wash machine may be configured to dynamically switch from a first wash program for a first part to a second wash program for a second part based on respective first and second unique identifiers associated with the first and second parts. As used herein, dynamically switching a wash program means that characteristics of a wash program (e.g., intensity and/or duration) used by a wash machine may be modified without additional intervention by an operator and/or programming based, in part, on a unique identifier associated with the part being washed. In some embodiments, the wash program being utilized by the wash machine for a part may be determined at the time that a unique identifier associated with the part is read by the appropriate identifier reader and compared to a database containing washing information for the given part.

In like manner, ovens (48) may be configured to execute a variety of different bake programs (again as may best suit objects made in particular configurations and/or from particular resins). Here, the part may be removed from its carrier platform (particularly if the NFC tag is not heat resistant), but can be moved on a transfer table to a transfer tray (47), where the transfer tray includes a more heat-stable unique identifier (such as a bar code) (105), and the transfer table includes a reader for both the carrier plate and the transfer tray (to associate in the database the particular part with a particular tray), and the oven (48) can include a reader and/or scanner for the transfer tray unique identifier (to associate, in the database, oven data with each particular tray, and hence to each particular part). Of course, multiple parts may be included on each tray, and other formats can be employed. For example, a sacrificial unique identifier (such as an NFC tag) can be fastened to or associated with the part as it enters the oven, and although destroyed during the bake program, can still be utilized to associate in the database the particular part with a particular oven, bake program, and operator, or other cure step information (see, for example, FIG. 8). As with the washer, the oven may be configured to execute a variety of different cure (particularly bake) program options, as shown in FIG. 7. If the bake program is not pre-set (as may again be the case for higher volume through-put of similar parts), then the oven can be configured to select the appropriate bake program for each part, based on information in the database on part configuration and/or resin type. In some embodiments, as discussed herein with the wash machine, the appropriate bake program for a part may be dynamically selected at the time of baking based on the unique identifier associated with the part that is read or otherwise accessed by the oven. In some embodiments, the oven may be configured to switch between a first set of curing options for the oven (see, e.g., FIG. 7) and a second set of curing options based the unique identifier associated with a given part.

In some embodiments, when preparing a part for curing, one or more parts may be selected for simultaneous curing based, in part, on the unique identifier for the respective parts. For example, when transferring parts from a carrier platform to a transfer tray, it may be determined, based on the unique identifiers for the parts, that one or more parts share a curing configuration. In such a circumstance, the parts sharing the curing configuration may be combined, such as by including the parts on a same transfer tray or loading the parts separately into the oven at a same time, so that they may be cured simultaneously. In some embodiments, for example, when curing follows washing, a system controller may identify parts which share curing configurations during a washing step (or other step which precedes curing) and may proactively schedule simultaneous curing for one or more parts. In some embodiments, an order in which parts are cured may not match an order in which parts are washed and/or manufactured, as parts are moved ahead or behind in order to combine parts for curing. Such a combination of parts may allow the manufacturing process to dynamically schedule curing so as to more efficiently utilize curing equipment by combining parts which cure for a similar amount of time at a similar temperature.

And again in like manner, in a support removal station such as schematically illustrated in FIG. 14, a tool mounted on a robotic arm may be guided to separate supports from the part (e.g., by cutting) through a suitable controller based on the known geometry of the part, as recognized at the support removal station by a unique identifier reader for either the part itself, or the carrier plate on which the part was produced.

Where parts have a unique identifier formed thereon, such as an alphanumeric and/or symbol indicator as noted above, washers, ovens, or other peripheral machines can simply include a camera for recording that information from a particular part, to which it can be added to the database, in addition to or as an alternative to some of the options for unique identifiers described above. In some embodiments, the unique identifier may be formed on a portion of the part that is removed by the support removal station. In some embodiments, the unique identifier may be formed on a portion of the part that remains after manufacturing. In some embodiments, the unique identifier may include a combination of segments, some of which are removed by the support removal station and some of which remain on the part after manufacturing.

Part unique identifiers. As noted above, a part unique identifier may be imparted to a part by a system as described in FIGS. 4A-4B. Such a unique identifier may be physically formed on the surface or other location of the part, chemically or photochemically formed on or within the part, or by any other suitable technique. The unique identifier may be arbitrary (e.g., simply a sequential or non-sequential numbering of the part), or may include specific information about the manufacturing process of the part. Examples of such specific information that may be included within a part of a unique identifier include, but are not limited to:

(A) Additive manufacturing device (or "printer") specific identity;

(B) Project number (i.e., a common number assigned to all similar or related parts);

(C) Print number (i.e., a number uniquely assigned to one specific part);

(D) Build platform and/or window cassette position identity (i.e., an indication of the specific location on a "window" on which a particular part was produced, particularly useful when multiple parts are concurrently produced at the same time on the same build platform);

(E) Window cassette unique identity;

(F) Date of production.

(G) Resin type and/or identity

For example, in one embodiment, the part unique identifier may comprise a set of characters including A-B-C-D as defined above. In another embodiment, the part unique identifier may comprise a set of characters including C-E-F, as defined above. In some embodiments, the part unique identifier may be a sequence of alphanumeric characters and/or symbols from which A-G, as defined above, may be retrieved from a database using the sequence of alphanumeric characters and/or symbols. Numerous combinations of the foregoing, or other characteristics, will be apparent, and specific embodiments will depend upon the field and use of the particular part being made.

Figure 4A:
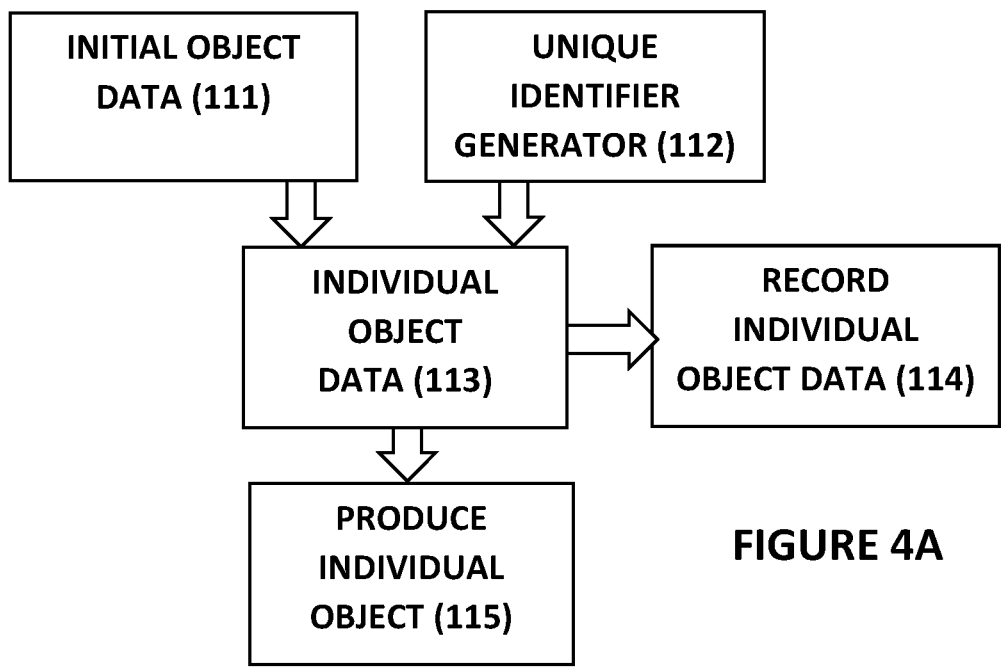
FIG. 4A is a flow chart schematically illustrating one process of assigning and generating an individual object with a unique identifier for that object, by additive manufacturing.

FIG. 4A is a flow chart schematically illustrating one process of assigning and generating an individual object with a unique identifier for that object, by additive manufacturing. In some embodiments, the object may be a part to be manufactured by additive manufacturing. For example, as illustrated in FIG. 4A, a process for assigning and generating an individual object with a unique identifier may include, as an input, initial object data. The initial object data may be, for example, a part geometry file or other set of instructions for generating a part by additive manufacturing. In addition, the process may include a unique identifier generator configured to generate a unique identifier. As used herein, "unique" does not necessarily mean that the identifier is universally unique. For example, a unique identifier may be unique to a given manufacturer, a given part, a given manufacturing facility, etc. As used herein, a unique identifier is one in which a given part may be uniquely identified as determined by the particular manufacturing circumstances. The unique identifier generator may, in some embodiments, include a software program configured to generate a unique identifier based on one or more characteristics of a manufactured part, as discussed herein.

For a particular manufactured part, the initial object data (111) for the part may be combined with a unique identifier from the unique identifier generator (112) to generate individual object data. The individual object data may, for instance, identify a particular manufactured instance of a part described by the initial object data. Once generated, the individual object data may be recorded in a database (114). Future operations performed on the part during, and beyond, manufacturing may be associated with the individual object data. In some embodiments, the individual object data may include a unique sequence of alphanumeric characters and/or symbols. In some embodiments, data associated with the individual object during manufacturing may be stored in the database associated with the unique sequence of alphanumeric characters and/or symbols. For example, after generating the individual object data for the part, the part may be manufactured (115). As discussed herein, during manufacturing of the part, data associated with the manufacturing process may be stored in the database and associated with the individual object data.

Figure 4B:
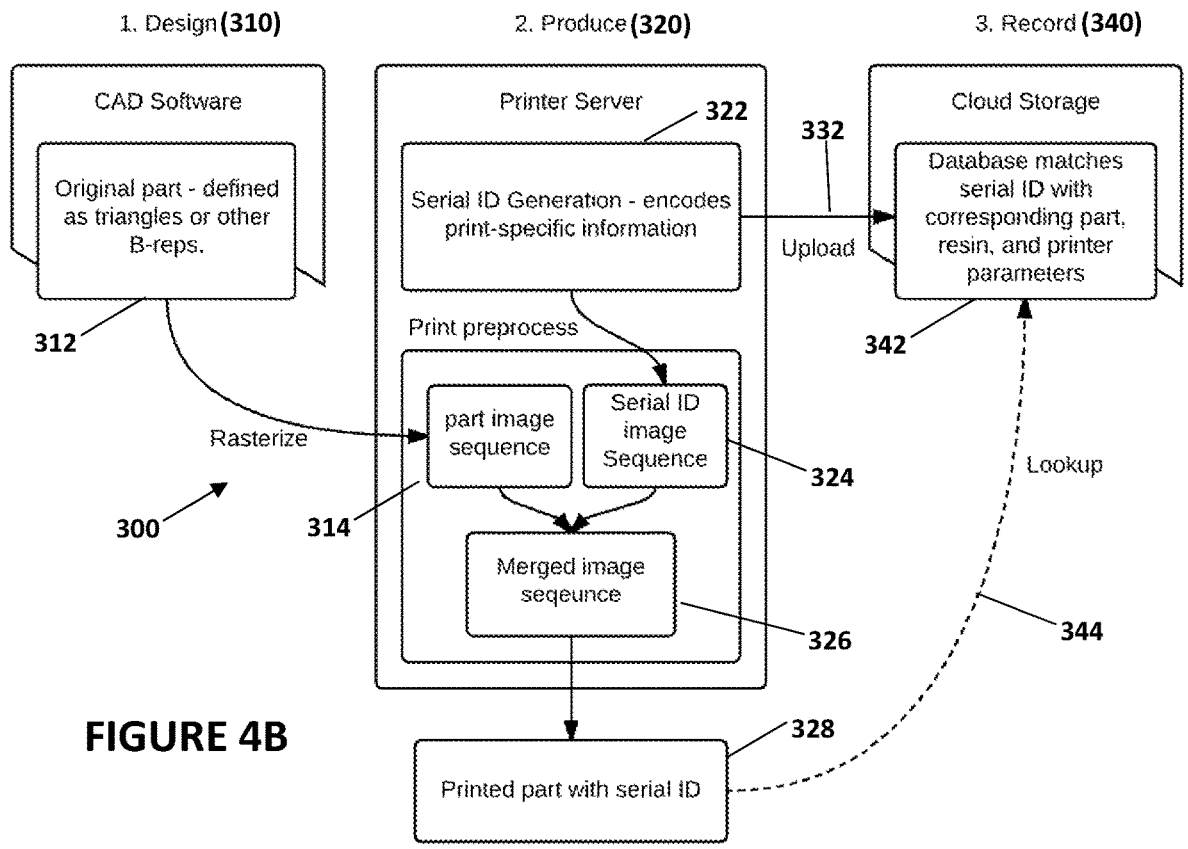
FIG. 4B is a flow chart of a particular embodiment of FIG. 4A.
Figure 9A:
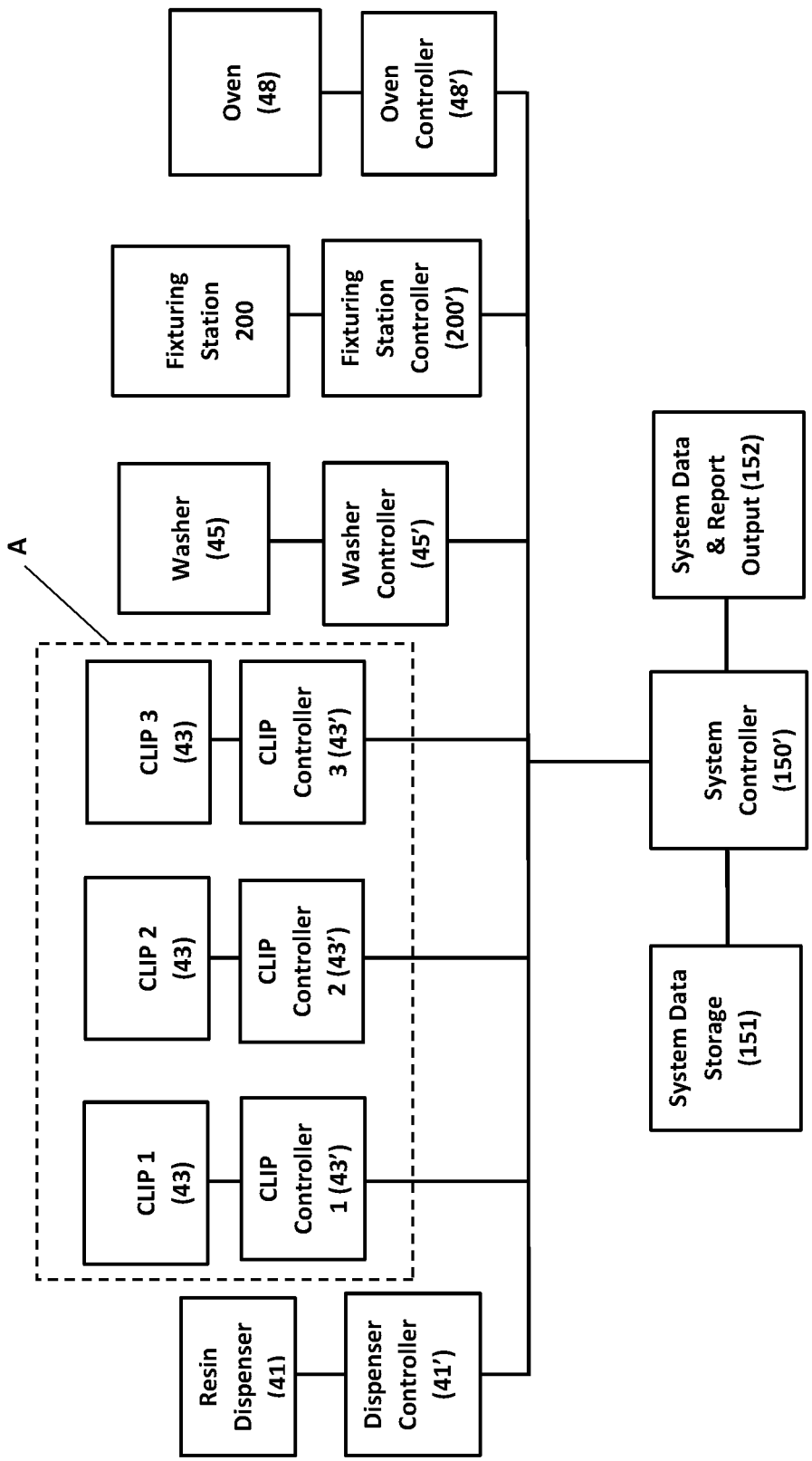
FIG. 9A schematically illustrates one embodiment of an integrated system of the present invention.
Figure 9B:
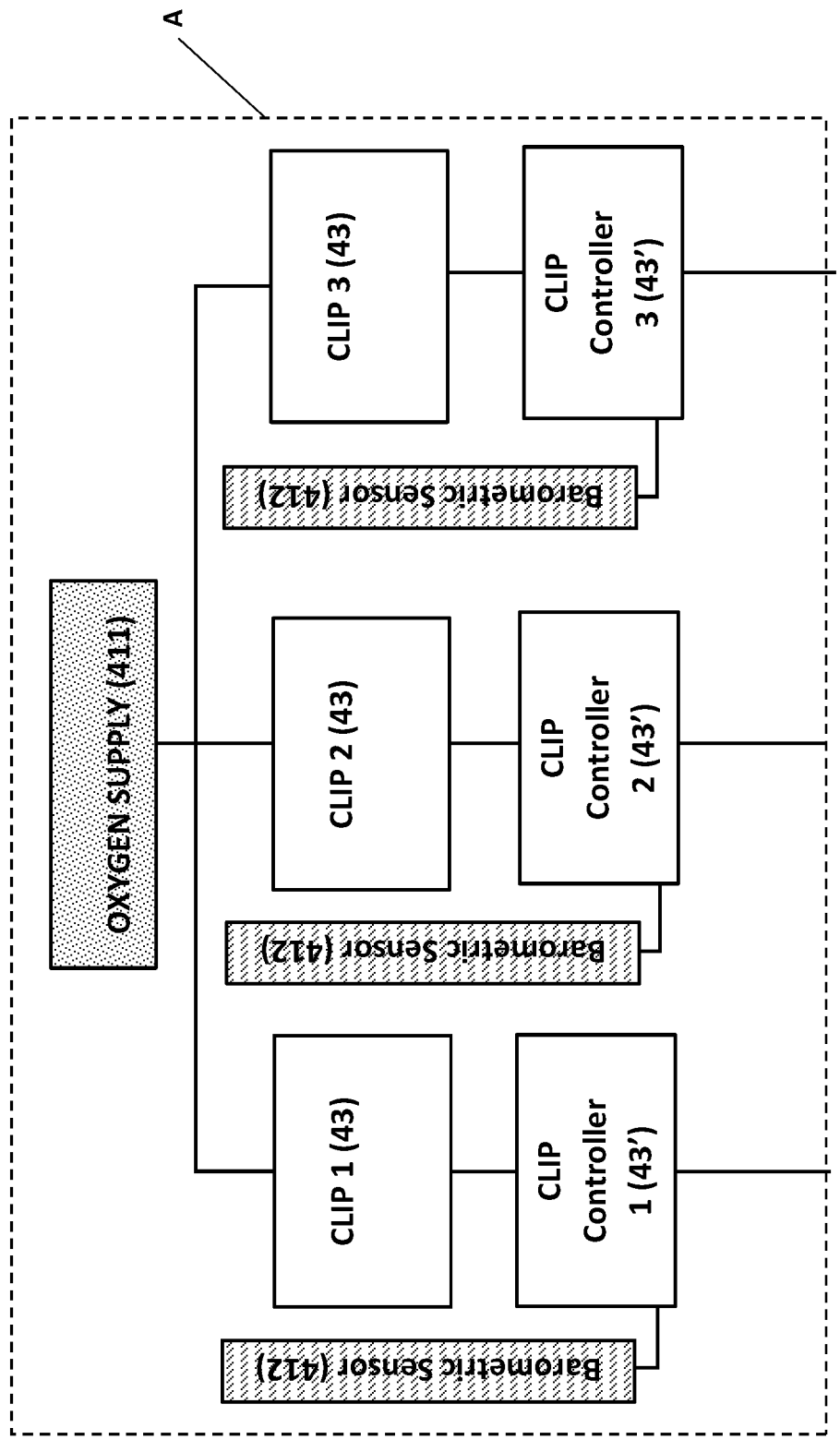
FIG. 9B is a detailed view of the portion 'A' of FIG. 9A shown in the dashed box, further illustrating an oxygen supply and barometric sensing/atmospheric pressure sensing features.

FIG. 4B is a flow chart of a particular embodiment of FIG. 4A. As illustrated in FIG. 4B, an additive manufacturing process (300) for a part according to embodiments of the present invention may include a Design portion (310), a Production portion (320), and a Recording portion (330). During the Design portion (310), a set of initial object data (312) may be generated for the part to be manufactured. In some embodiments, the initial object data (312) may be generated using design software, such as Computer-Aided Design (CAD) software, though the present invention is not limited thereto. Such CAD software may generate data files which may be used during a manufacturing step to additively manufacture a part, such as via CLIP processes. In some embodiments, the part may be represented in the initial object data (312) in various formats, such as by a plurality of polygons (e.g., triangles) and/or other forms of boundary representation (B-reps), though the present invention is not limited thereto. In some embodiments, the initial object data (312) may include data represented in a format used in stereolithography, such as a .stl file.

During the Production portion (320), a unique identifier (322) may be generated. In some embodiments, the unique identifier (322) may be a serial identification (ID) composed of alphanumeric numbers and/or symbols. During a print preprocess step of the production, the initial object data file (312) may be broken out in a set of part image sequences (314). In some embodiments, this may be done by performing a rasterization process on the initial object data file (312). In addition, the generated serial ID (322) may be broken out into a series of serial ID image sequences (324). These image sequences may be used by an additive manufacturing system to additively manufacture the part and/or the serial ID (322). In some embodiments, the part image sequences (314) may be used to configure the additive manufacturing system to manufacture the part, and the serial ID image sequences (324) may be used to configure the additive manufacturing system to manufacture the serial ID (322) (e.g., as a unique identifier). The system controller may be configured to combine the part image sequences (314) and the serial ID image sequences (324) into at least one merged image sequence (326). The merged image sequence (326) may be used to configure the additive manufacturing system to manufacture the part (328) with the serial ID (322) on or within the part (328).

In order to generate the merged image sequence (326), the controller may be configured to select a location on or within the part (328) to place the serial ID (322). The location may be based on a geometry of the surface of the part (328), a preferred location of the serial ID (322), and/or other characteristic of the part (328) and/or the manufacturing process. In some embodiments, the location for the serial ID (322) may be included as part of the initial object data (312). For example, an initially generated CAD file (312) may include a container (e.g., a placeholder) for the to-be-generated serial ID (322). In some embodiments, the location may be dynamically determined. In some embodiments, the location for the serial ID (322) may be based on criteria such as whether a given location is in a cosmetically critical area and/or whether a given location is accessible for inspection (e.g., by human eyes and/or machine readers).

In some embodiments, generating the merged image sequence (326) may include altering the original part geometry to place the serial ID (322) on or within the part (328). In some embodiments, the merged image sequence (326) will differ from the part image sequence (314). In other words, a part (328) additively manufactured from the merged image sequence (326) will differ from a part additively manufactured from the part image sequence (314) (e.g., will contain the serial ID (322) on or within the part (328)).

During a Recording portion (340) of the process, the generated serial ID (322) may be uploaded (332) to a database (342). Subsequent operations related to the part (328) may be associated in the database with (342) the generated serial ID (322), as discussed herein. For example, the additive manufacturing process may manufacture the part (328) based on the merged image sequence (326). While manufacturing the part (328), data associated with the manufacturing process may be recorded in the database (342), associated with the serial ID (322) (e.g., as a unique identifier) generated for the part (328). In such a way, data associated with the manufacturing of the part (328) such as, for example, printer configuration, resin configuration, etc. may be associated with the part (328) for later retrieval (344). As illustrated in FIG. 4B, recorded data associated with the part (328) may be collected prior to manufacturing the part (328) (e.g., during pre-production) and/or during manufacture. In some embodiments, recording can continue after manufacturing of the part, such as the recording of information related to shipment of the part (328), sale of the part (328), and/or customer feedback associated with the part (328) (see FIG. 11).

System architecture. Non-limiting examples of system architectures are given in FIGS. 9-11. Nevertheless, it will be appreciated that any of a variety of different architectures can be employed. Controllers (41', 43', 45', 48', 60', 150', 170', 200', 220') can be a general purpose computer dedicated to, or on board, a particular apparatus; a local general purpose computer operatively associated with a group of machines via a local area network (or metropolitan area network) (see, for example, FIG. 9A); a remote general purpose computer operatively associated with machines via a wide area network or internet connection (see, for example, FIG. 10; system 160); and combinations thereof (for example, organized in a client-server architecture and/or distributed architecture).

Peripheral devices for data entry and display can be implemented in any of a variety of ways known in the art, including typical keypad entry, video display, and printing apparatus (152, 173), as well as graphical user interfaces such as touch-pads, touch-screens and the like, including smart-phone touch screens.

The controller may use hardware, software implemented with hardware, firmware, tangible computer-readable storage media having instructions stored thereon, and/or a combination thereof, and may be implemented in one or more computer systems or other processing systems. The controller may also utilize a virtual instance of a computer. As such, the devices and methods described herein may be embodied in any combination of hardware and software that may all generally be referred to herein as a "circuit," "module," "component," and/or "system." Furthermore, aspects of the present invention may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

In some embodiments, the controller may include at least one processor. The at least one processor of the controller may be configured to execute computer program code for carrying out operations for aspects of the present invention, which computer program code may be written in any combination of one or more programming languages, including an object oriented programming language such as Java, Scala, Smalltalk, Eiffel, JADE, Emerald, C++, C #, VB.NET, or the like, conventional procedural programming languages, such as the "C" programming language, Visual Basic, Fortran 2003, COBOL 2002, PHP, ABAP, dynamic programming languages such as Python, PERL, Ruby, and Groovy, or other programming languages.

The at least one processor may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks.

Data storage or memory (151, 171) of the controller can be on separate (volatile and/or non-volatile) memory devices located locally or remotely, partitioned sections of a single memory device, etc., including combinations thereof (e.g., a remote back-up memory in addition to a local memory). For example, the database referred to herein may be one or more databases stored locally to the controller or remote. In some embodiments, the database may be remotely accessible by the controller.

Figure 11:
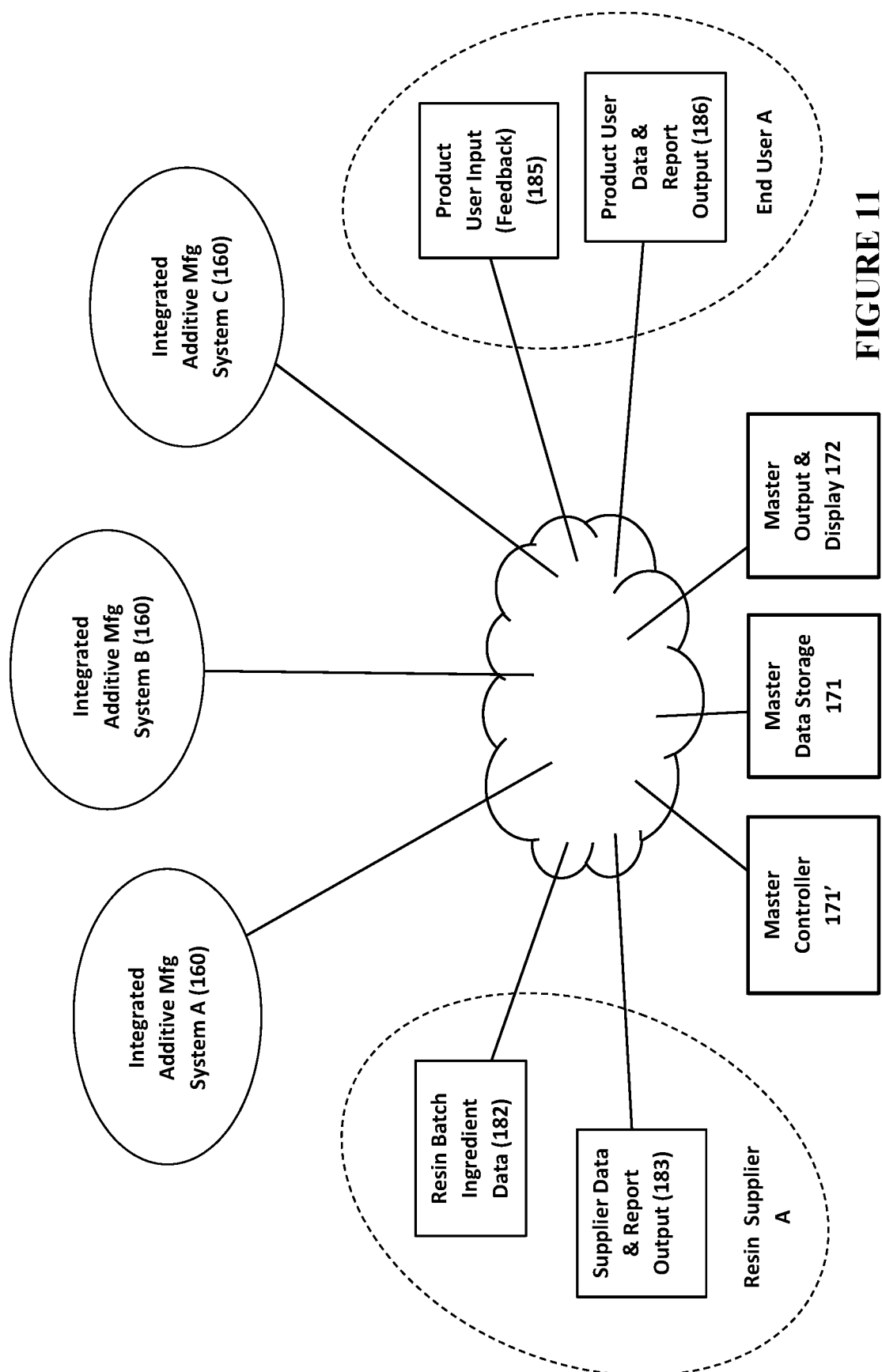
FIG. 11 schematically illustrates multiple integrated systems which are further integrated with one another in one embodiment of the present invention.

Since multiple different manufacturers may use resins from a common supplier, a higher level of system integration may be desirable, as shown in FIG. 11. Here, the resin supplier ("A" shown, but additional may be included) can enter resin type and batch data into a master database (182, 183), which can be shared across multiple separate additive manufacturing systems ("A," "B," and "C" shown, but additional may be included). Also, since end user feedback (either survey solicited or voluntary) or further chain-of-sale information may be useful to the manufacturer, input/output devices (185, 186) (such as a smart phone application, or a program running on a remote computer, etc.) can be included for adding to the database customer feedback and use information on a particular part ((end user "A" shown, but additional can be included). A report from such a system for a particular part may include some or all of the information fields shown in FIG. 12. Since product configuration data (e.g., .stl files) or other manufacturing information (in some cases, production program, wash program, and/or bake program) can be proprietary to a particular manufacturer, the controllers can be configured so that reports for other participants such as end users, or as a master report containing information across different manufacturers, excludes or automatically redacts that information. Or, that information can be partitioned or separated in data storage so that it is never available for such end user or master reports in the first instance.

Robotics. Transfer of workpieces such as transfer of the carrier platform from the additive manufacturing apparatus to the wash apparatus, transfer of the carrier platform from the wash apparatus to the curing apparatus, transfer of the build plate from an additive manufacturing apparatus to a cleaning apparatus, transfer of a resin cartridge to an additive manufacturing apparatus, etc., may be carried out manually, robotically (60), or combinations thereof. Systems for robotic transfer can be implemented in accordance with known techniques employed in robotic manufacturing systems, or variations thereof that will be apparent to those skilled in the art. See, e.g., U.S. Pat. Nos. 6,627,016; 6,694,224; 7,146,705; 8,651,160; 8,668,423; and 9,351,569.

While FIGS. 9A-11 describe systems utilizing a CLIP additive manufacturing apparatus, recall that any suitable additive manufacturing apparatus can be used in the system described herein, including but not limited to other apparatus for bottom-up or top-down stereolithography, as discussed generally in section 2 above. Where a CLIP apparatus is employed, some such apparatus employ atmospheric oxygen as an inhibitor of polymerization, and others employ an oxygen source (e.g., a gas enriched in oxygen) as the inhibitor of polymerization. The oxygen source may be compressed gas enriched in oxygen, an oxygen generator, an oxygen concentrator, or any other suitable supply, located or associated with each machine, or a shared source (411) such as shown in FIG. 9B or bottled oxygen on each machine, a distributed oxygen supply. Similarly, since the oxygen concentration in resin during CLIP apparatus operation may be sensitize to fluctuations in atmospheric pressure, a barometric sensor (412) may be associated with each machine (as also shown in FIG. 9B), or a shared sensor may be employed, or atmospheric oxygen or atmospheric pressure data obtained via an external source such as the world wide web. Such data may be used by each CLIP apparatus at a particular location to further enrich or deplete oxygen supplied to each machine, such as by metering the flow of enriched oxygen gas to the build surface, window or window cassette of a particular apparatus. See generally B. Feller, D. Moore et al., PCT Application Pub. No. WO/2018/006029 and B. Feller, D. Moore et al., PCT Application Pub. No. WO/2018/006018.

The foregoing is illustrative of the present invention, and is not to be construed as limiting thereof. The invention is defined by the following claims, with equivalents of the claims to be included therein.

We claim:

1. An integrated additive manufacturing system, comprising:
   (a) at least one resin supply;
   (b) a plurality of additive manufacturing machines on which parts may be produced, each of said additive manufacturing machines operatively associated with said at least one resin supply;
   (c) at least one peripheral machine operatively associated with each of said additive manufacturing machines and said at least one resin supply; and
   (d) a database operatively associated with each of said additive manufacturing machines, said database configured to record part configuration data for each part produced on each additive manufacturing machine,
   wherein said at least one peripheral machine comprises a part washing machine, and wherein:
   each of said additive manufacturing machines includes a releasable carrier plate on which a part is produced from said resin supply, each of said carrier plates having a carrier plate unique identifier operatively associated therewith;
   said database is further configured to record both part configuration data and resin data for each part produced on each carrier plate;
   said part washing machine includes a carrier plate unique identifier reader operatively associated therewith;
   said part washing machine is configured to select and carry out a part washing process on each part from a plurality of different part washing processes based on: (i) part configuration data, (ii) specific resin data, or (iii) both part configuration data and specific resin data; and
   said database configured to record washing process data for each part washed in said part washing machine.

2. The system of claim 1, wherein said at least one resin supply comprises a single-use resin supply or a bulk resin supply,
   each of which can be associated with either one of or a plurality of said additive manufacturing machines,
   and each of which can optionally include an automated resin feed system configured to supply resin to one of, or a plurality of, said additive manufacturing machines.

3. The system of claim 1, wherein said at least one peripheral machine comprises:
   at least one part post-production machine, such as at least one of a part washing machine, a part penetrant bath apparatus, a part oven, a part cutting, grinding, and/or texturing machine, a part painting machine, or a combination thereof; and/or
   at least one maintenance machine configured to maintain or replace a component of said additive manufacturing machines, such as a build plate cleaning machine.

4. The system of claim 1, wherein:
   said database is further configured to contain specific resin data for each of a plurality of different resins;
   said at least one resin supply comprises a resin container having a resin therein and a resin unique identifier operatively associated therewith, said resin unique identifier associated with specific resin data for the contained resin; and
   each of said plurality of additive manufacturing machines comprises a resin unique identifier reader operatively associated therewith and a resin reservoir configured to receive resin from said resin container; with
   each of said plurality of additive manufacturing machines configured to carry out a part production process with said resin based on both part configuration data and said specific resin data.

5. The system of claim 1, wherein:
   at least one of said peripheral machines is configured to releasably secure said carrier plate.

6. The system of claim 1, further comprising:
   (e) an oven operatively associated with each of said additive manufacturing machines;
   with said oven configured to select and carry out a baking process on each part from a plurality of different baking processes based on: (i) part configuration data, (ii)

specific resin data, or (iii) both part configuration data and specific resin data; and with said database configured to record baking process data for each part baked in said oven.

7. The system of claim 6, wherein the oven comprises a gas source configured to purge the oven with an inert gas during baking of parts therein.

8. The system of claim 1, each of said additive manufacturing machines configured to apply a part unique identifier to each part produced thereon;

with said database further configured to record said part unique identifier from each of said additive manufacturing machines.

9. The system of claim 1, each of said additive manufacturing machines including an interchangeable build plate, said build plate including an optically transparent member and a build plate unique identifier, with each of said plurality of additive manufacturing machines further including a build plate unique identifier reader;

and with said database further configured to record build plate data for each part produced on each of said plurality of additive manufacturing machines.

10. The system of claim 1, wherein each said part remains on the carrier plate on which said part was produced.

11. The system of claim 1, wherein said database is configured to record a time of wash for each part washed in said part washing machine.

12. The system of claim 1, wherein said database is further configured to record time of production for each part produced on each carrier plate.

13. The system of claim 6, wherein each said part remains on the carrier plate on which said part was produced.

14. The system of claim 6, wherein said database is configured to record a time of bake for each part baked in said oven.

15. The system of claim 8, wherein the part unique identifier comprises a set of alphanumeric characters and/or symbols appearing on a surface or other location of the part produced.

16. An integrated additive manufacturing system, comprising:

at least one resin supply comprising resin data;

a plurality of additive manufacturing machines on which parts may be produced, each of the plurality of additive manufacturing machines operatively associated with the at least one resin supply, wherein each of the parts produced by the plurality of additive manufacturing machines is associated with a unique identifier;

a peripheral machine operatively associated with each of the plurality of additive manufacturing machines and configured to perform operations on the parts produced by the plurality of additive manufacturing machines; and a database operatively associated with each of the plurality of additive manufacturing machines and the peripheral machine, the database configured to:

associate part configuration data and/or the resin data for each of the parts produced on each of the plurality of additive manufacturing machines with the unique identifier of each of the parts; and communicate the part configuration data and/or the resin data to the peripheral machine, wherein the peripheral machine is configured to perform the operations on the parts based on the part configuration data and/or the resin data that is associated with the unique identifier of respective ones of the parts.

17. The system of claim 16, wherein the peripheral machine comprises an oven.

18. The system of claim 16, wherein the peripheral machine is further configured to spin each of the parts to centrifugally remove residual resin and/or wash liquid.

\* \* \* \* \*